(12) United States Patent
Cornett et al.

(10) Patent No.: US 11,797,333 B2
(45) Date of Patent: Oct. 24, 2023

(54) EFFICIENT RECEIVE INTERRUPT SIGNALING

(71) Applicant: Intel Corporation, Santa Clara, CA (US)

(72) Inventors: Linden Cornett, Portland, OR (US);
Anil Vasudevan, Portland, OR (US);
Parthasarathy Sarangam, Portland, OR (US); Kiran Patil, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 16/710,556

(22) Filed: Dec. 11, 2019

(65) Prior Publication Data

US 2020/0183732 A1    Jun. 11, 2020

(51) Int. Cl.
G06F 9/46     (2006.01)
G06F 9/48     (2006.01)
G06F 9/50     (2006.01)

(52) U.S. Cl.
CPC .......... G06F 9/4812 (2013.01); G06F 9/5077 (2013.01); G06F 2209/5011 (2013.01)

(58) Field of Classification Search
CPC .................. G06F 9/4812; G06F 9/5077; G06F 2209/5011

See application file for complete search history.

(56) References Cited

U.S. PATENT DOCUMENTS

| 6,070,219 A * | 5/2000 | McAlpine ................ H04L 9/40 710/263 |
| 7,937,499 B1 * | 5/2011 | Tripathi ................ H04L 49/901 709/250 |
| 8,566,494 B2 * | 10/2013 | Li .......................... G06F 13/24 710/263 |
| 2007/0005742 A1 * | 1/2007 | Eldar ..................... G06F 9/4812 709/223 |
| 2017/0353403 A1 * | 12/2017 | Zemach ................ H04L 49/103 |
| 2018/0157514 A1 * | 6/2018 | Malloy ................. H04L 45/306 |

FOREIGN PATENT DOCUMENTS

KR    20140106912 A  *  9/2014  .......... H04L 47/125

* cited by examiner

*Primary Examiner* — Diem K Cao
(74) *Attorney, Agent, or Firm* — Compass IP Law PC

(57) ABSTRACT

Methods for performing efficient receive interrupt signaling and associated apparatus, computing platform, software, and firmware. Receive (RX) queues in which descriptors associated with packets are enqueued are implemented in host memory and logically partitioned into pools, with each RX queue pool associated with a respective interrupt vector. Receive event queues (REQs) associated with respective RX queue pools and interrupt vectors are also implemented in host memory. Event generation is selectively enabled for some RX queues, while event generation is masked for others. In response to event causes for RX queues that are event generation-enabled, associated events are generated and enqueued in the REQs and interrupts on associated interrupt vectors are asserted. The events are serviced by accessing the events in the REQs, which identify the RX queue for the event and a next activity location at which a next descriptor to be processed is located. After asserting an interrupt, an RX queue may be auto-masked to prevent generation of additional events when new descriptors are enqueued in the RX queue.

25 Claims, 17 Drawing Sheets

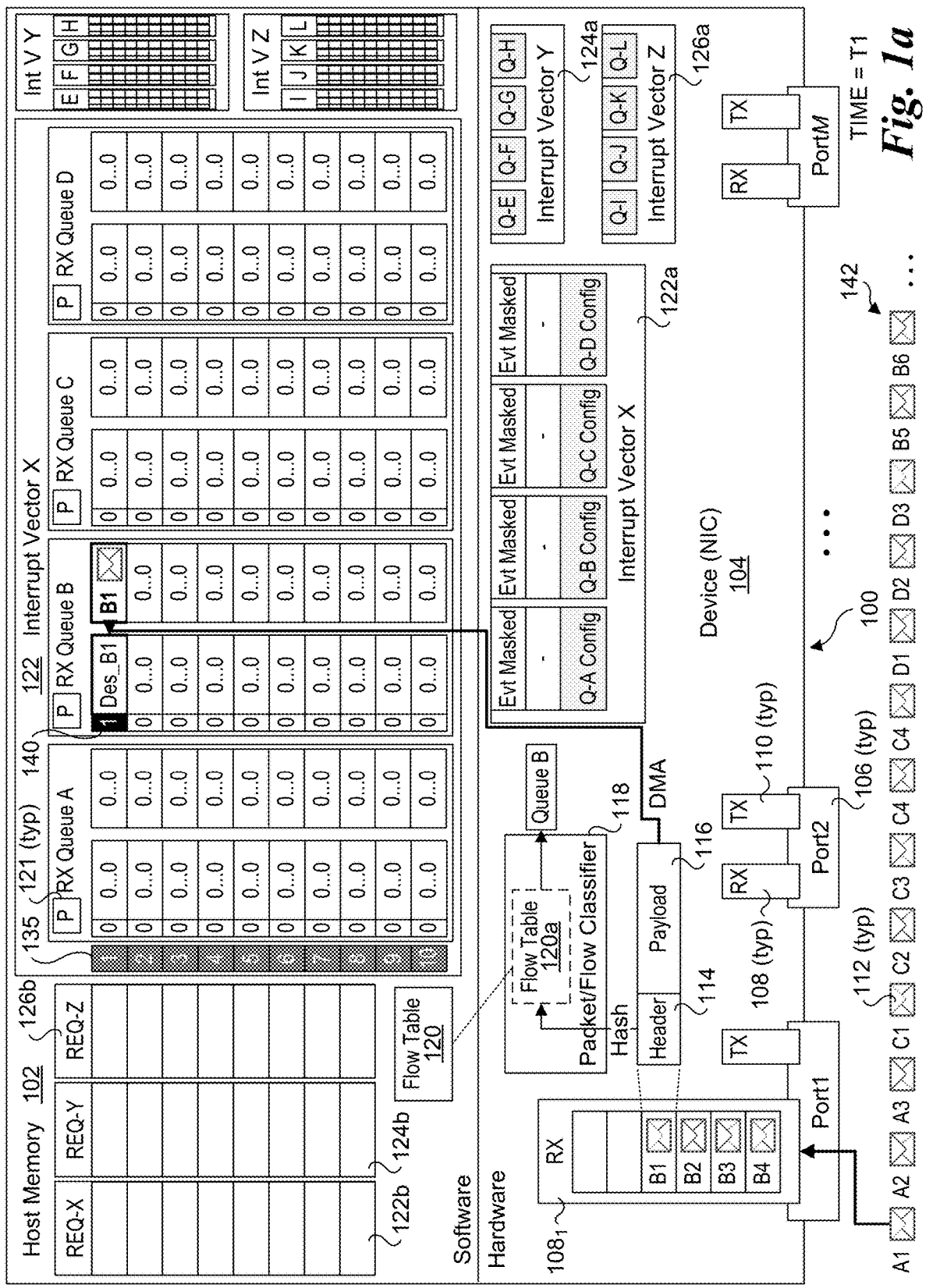

EFFICIENT RECEIVE INTERRUPT SIGNALING

BACKGROUND INFORMATION

The use of cloud-hosted services and other data center uses has increased exponentially during the past decade and are forecast to see increasing use going forward. A significant amount of the workload handled by servers (aka "hosts") used to support cloud-hosted services is performing packet-processing operations. Historically, packet-processing was performed primarily by a software networking stack. This resulted in a tremendous amount of CPU overhead and limited scalability as software processing became a bottleneck in the packet-processing (and transfer) pipeline. More recently, network adapters and the like have been developed that include on-board processing facilities for performing aspects of packet-processing operations, such as flow classification and DMA (Direct Memory Access) queuing under which packets for given flows are enqueued in buffers in host memory (referred to as receive queues) using DMA data transfers. Software-based packet processing is then performed to handle packets that have been enqueued in the receive queues.

Various mechanisms are used to facilitate handover of packet processing to software running on the host. For example, under one mechanism referred to as a "polling mode," software such as an operating system (OS) driver may poll receive queues in host memory to determine whether any new packets have been received that need to be processed. Another mechanism referred to as an "interrupt mode" uses interrupts initiated by the hardware (e.g., network adaptor) to notify software of new work that needs to be done. For example, a network adaptor may employ a Message Signaled Interrupt (MSI) or MSI-X interrupt or "vector" to notify software of a corresponding interrupt event that needs to be serviced.

In some environments, receive queues need to transition back and forth between polling mode and interrupt mode depending on traffic patterns. When in interrupt mode, the goal is to notify the application when traffic is available as quickly as possible and with a minimum of chatter between hardware and software. It is not feasible to have a separate interrupt vector for every receive queue, due to system limitations. Accordingly, in some cases there may be dozens or hundreds of receive queues sharing a single vector. Generally, the receive queues will be associated with different applications, and potentially running in different software threads/contexts in the host. Therefore, it is problematic to require software to check every receive queue associated with a given interrupt vector to determine which receive queue is ready to be processed by software.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1a is a schematic diagram illustrating the state of the platform of FIG. 1 at a first time T1;

DETAILED DESCRIPTION

Figure 1:
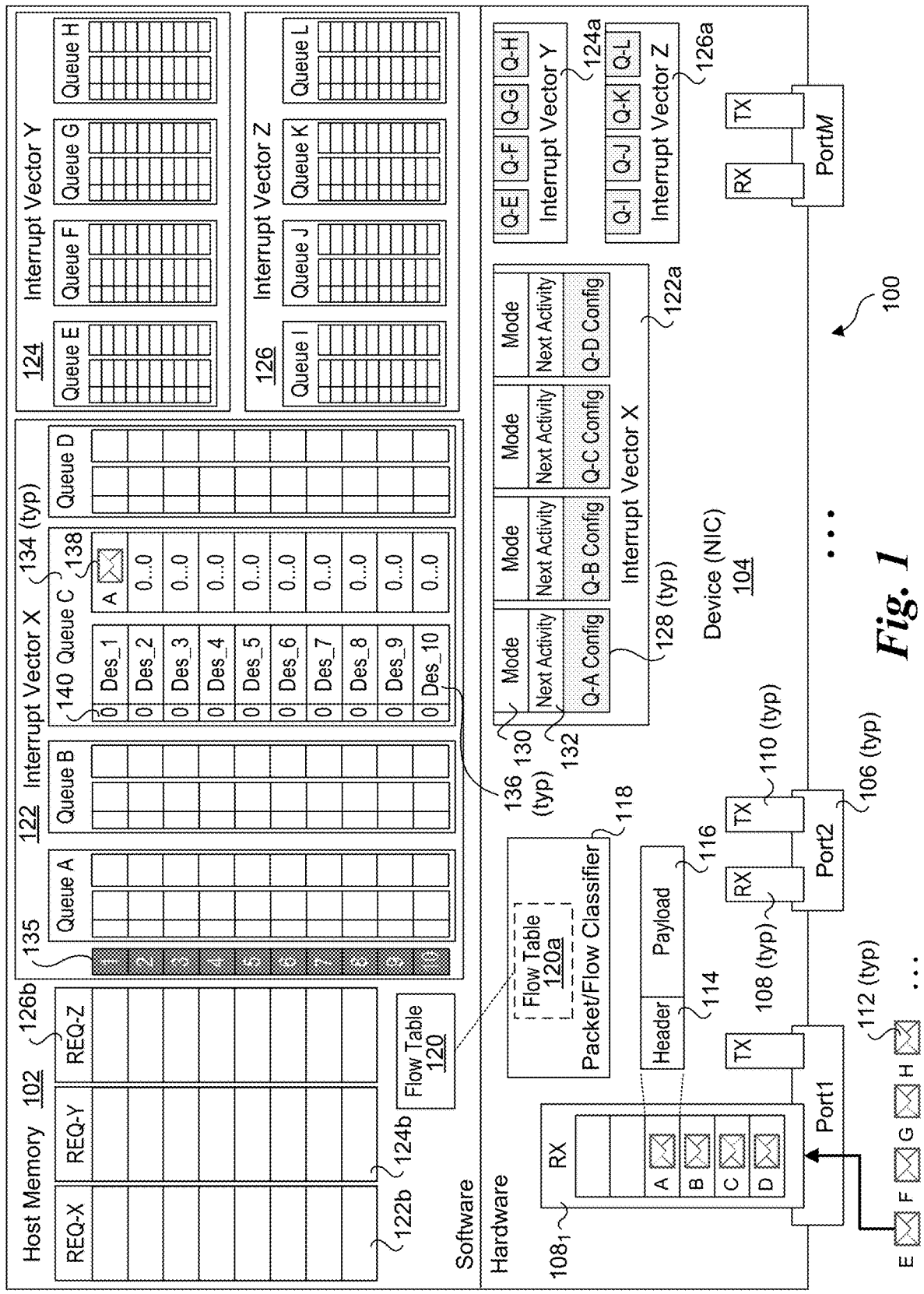
FIG. 1 is a schematic diagram of a platform including software and hardware layers in which aspects of the embodiments disclosed herein may be implemented.

Embodiments of methods for performing efficient receive interrupt signaling and associated apparatus, computing platforms, software, and firmware are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, methods and associated mechanisms for efficient receive interrupt signaling are provided. Receive (RX) queues are logically partitioned into pools, with each RX queue pool associated with a respective interrupt vector. Under one aspect, explicit notification to an "event queue" in host memory is provided when there is activity on a RX queue associated with a given interrupt vector, wherein the explicit notification includes information identifying the RX queue and a next activity location at which a new descriptor has been enqueued. When an interrupt on the interrupt vector is asserted, the host (via a software thread) accesses the event in the event queue for the interrupt vector to service the associated interrupt event. Under another aspect, message generation for individual receive (RX) queues in an RX queue pool associated with an interrupt vector is automatically disabled after certain interrupt events or causes, while message generation (and associated event queue notifications) for other RX queues with the same RX pool remain available.

FIG. 1 shows a platform 100 configured to implement aspects of the embodiments described herein. In one embodiment platform 100 is a computer server or similar type of computing platform that includes various hardware components such as one or more processors, memory, storage, input/output (I/O) devices, network adaptors or interfaces controllers, etc., which is used to host various software (e.g., an operating system, applications, software-based drivers, etc.). For illustrative purposes, only selected aspects of the platform hardware and software are shown for platform 100, including host memory 102 and a hardware device comprising a network interface controller (NIC) 104. FIGS. 1 and 1a-1i further show operations, data structures, and components in a software layer and a hardware layer.

NIC 104 is configured to facilitate communication between platform 100 and one or more computer networks (not shown) and includes M ports 106, where the number M is one or more. Each port 106 includes a receive (RX) buffer 108 and a transmit (TX) buffer 110. As shown, the RX buffer 108 for Port1 is configured as a First-In First-Out (FIFO) buffer (also referred as a FIFO queue) including a plurality of slots in which network packets 112 are buffered. (It is noted a given port 106 may include additional memory for buffering received packets that are not shown for simplicity and ease of explanation.) Each port 106 will include applicable Physical Layer (PHY) and Link Layer (e.g., Media Access Control or MAC) circuitry and logic to extract packet data from a stream of incoming packets, as depicted in FIG. 1 by packets A-H. For example, in one non-limiting example, the network is an Ethernet network, and the PHY and MAC will be configured to implement an applicable Ethernet protocol to enable hardware-extraction of Ethernet frames and then extraction of Ethernet packets from the frames. In addition, other types of network adaptors, controllers, interfaces, etc. may be implemented in place of NIC 104 in a similar manner to that described and illustrated herein, such as an InfiniBand Host Controller Adapter (HCA) or a Host Fabric Interface (HFI).

Each packet 112 includes a header 114 and a payload 116 in accordance with the applicable network protocol used by the computer network. For example, for Ethernet packets 112 will include an applicable Ethernet header and Ethernet payload. In one embodiment, NIC 104 is configured to perform hardware-based classification with software assistance. This is facilitated by a packet/flow classifier 118 including a flow table 120a. Software, such as an OS network driver or the like will maintain a flow table 120 in host memory 102. Flow table 120, which may also be referred to as a forwarding table or routing table, includes a plurality of entries providing information to map a given packet to a corresponding RX queue based on information in the packet's header. For example, one common scheme used for packet and/or flow classification is to use an n-tuple classification scheme, such as a 5-tuple scheme under which packet flows are classified based on 5 fields in the packet header (e.g., source address, source port number, destination address, destination port number, and protocol). Rather than do a match on each of the n-tuple fields, a hash is calculated over a concatenation of the field values and then compared to hash values in the flow table. Each hash value in the flow table is associated with a respective RX queue and packet flow.

When a packet 112 reaches the top of the FIFO in RX buffer $108_1$, its header 114 is "inspected" by reading data from the applicable classification fields, and a hash is performed over those data. In the event of a "miss," meaning there is not matching hash value (and thus not a matching flow table entry) in flow table 120a, the packet will be forwarded to software for classification. If there is no matching hash value in flow table 120, the software will create a new entry in flow table 120 with the hash value, followed by adding a copy of the new entry to flow table 120a. Generally, the entries in flow tables 120 and 120a may be synchronized (using various types of synchronization schemes) or flow table 120a will cache entries from flow table 120 using an applicable caching and cache eviction scheme. Under a caching scheme, the flow table maintained by software may already have an entry for a miss for the cached flow table entries in the hardware flow table, in which case the software will cache the applicable missing entry in the hardware flow table in response to the miss.

The foregoing components and operations are conventional and well-known in the art. The use of an n-tuple classification scheme is merely exemplary, as one of more of a myriad of classification schemes may be used, as are known in the networking art. More generally, the embodiments described below may be implemented using various packet/flow classification schemes that map packet flows to receive queues, with details of the particular classification scheme that is used being outside the scope of this disclosure.

The remaining components and data structures illustrated in FIG. 1 are new and are configured to implement improved packet processing. Under the embodiments herein, the RX queues used by the platform are logically partitioned (grouped) into RX queue pools, with each RX queue pool associated with a respective interrupt vector (used for the pool). The RX queue pools may also be referred to as interrupt vector pools, whereby the RX queues for a given RX queue pool are referred to by their associated interrupt vector. For illustrative purposes, three interrupt vector pools are shown in FIG. 1, including interrupt vector pools 122, 124, and 126, which are also labeled and referred to herein as by their interrupt vectors: Interrupt Vector X, Interrupt Vector Y, and Interrupt Vector Z. Also, for illustrative purposes and simplicity, each of interrupt vector pools 122, 124, and 126 is associated with four receive queues: RX Queues A, B, C, and D for Interrupt Vector X; RX Queues E, F, G, and H for Interrupt Vector Y; and RX Queues I, J, K, and L for Interrupt Vector Z. In an actual implementation an interrupt vector (RX queue) pool may include hundreds, thousands, or more RX queues. Similarly, the number of interrupt vector pools may generally number in the tens, hundreds or thousands. For example, in one non-limiting example using MSI-X vectors up to 2048 interrupt vector pools may be used (2048 is the current limit for MSI-X vectors). Under other existing or future interrupt vector schemes, more than 2048 vectors may be available. In addition, during run-time operations RX queues may be added or removed from existing pools, and new RX queue pools may be added or existing pools may be removed in response to traffic conditions and workloads.

Each of the interrupt vector pools includes a set of RX queues in host memory 102, as depicted by as interrupt vector pools 122, 124, and 126, and interrupt vector pool configuration information that is maintained in hardware (e.g., NIC 104), as depicted by interrupt vector pool configuration tables 122a, 124a, and 126a. Each interrupt vector pool configuration table includes a set of RX queue configuration information 128 for each respective RX queue including an operational mode field 130 and a "next activity" field 132. For illustrative purposes, each RX queue 134 in host memory 102 includes a plurality of rows or "slots" 135, each of which is depicted as including a descriptor 136 and packet data 138. Each descriptor may also be associated with a status or "generation" bit 140. For illustrative purposes and ease of explanation, each RX queue 134 is depicted as having 10 slots (1-10) in the figures herein; in practice, a given RX queue may have hundreds or even thousands of slots.

Figure 3A:
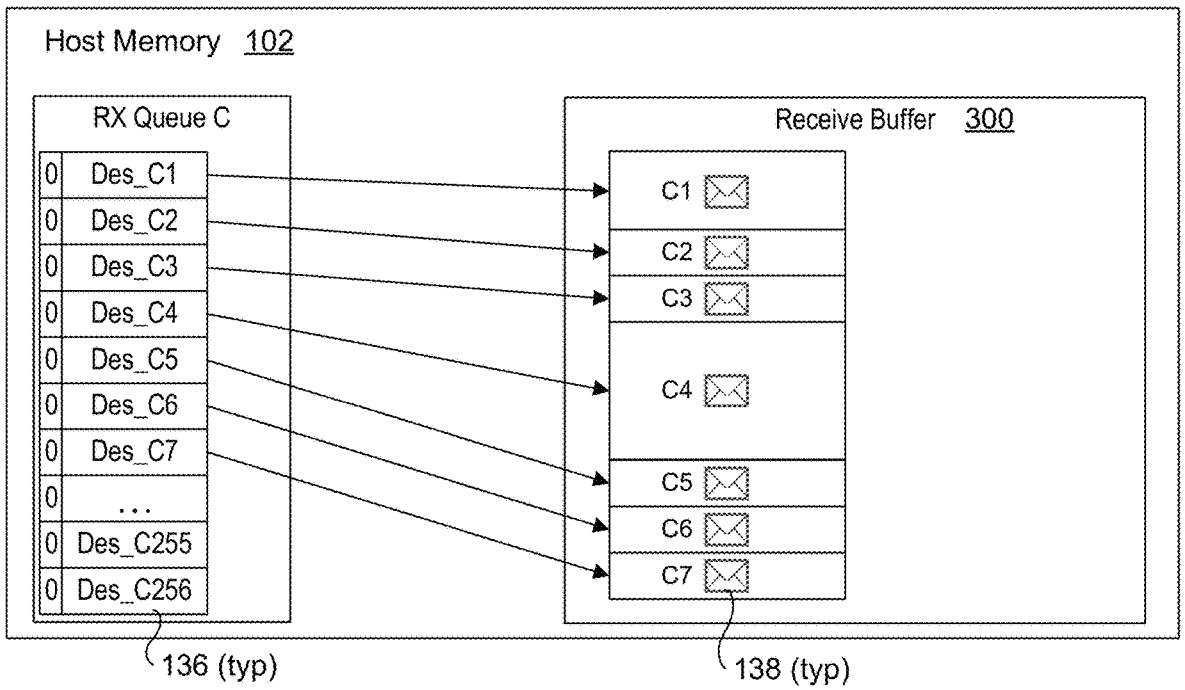
FIG. 3a is a diagram illustrating a first descriptor enqueuing and packet data storage scheme under which each descriptor is associated with a respective packet.
Figure 3B:
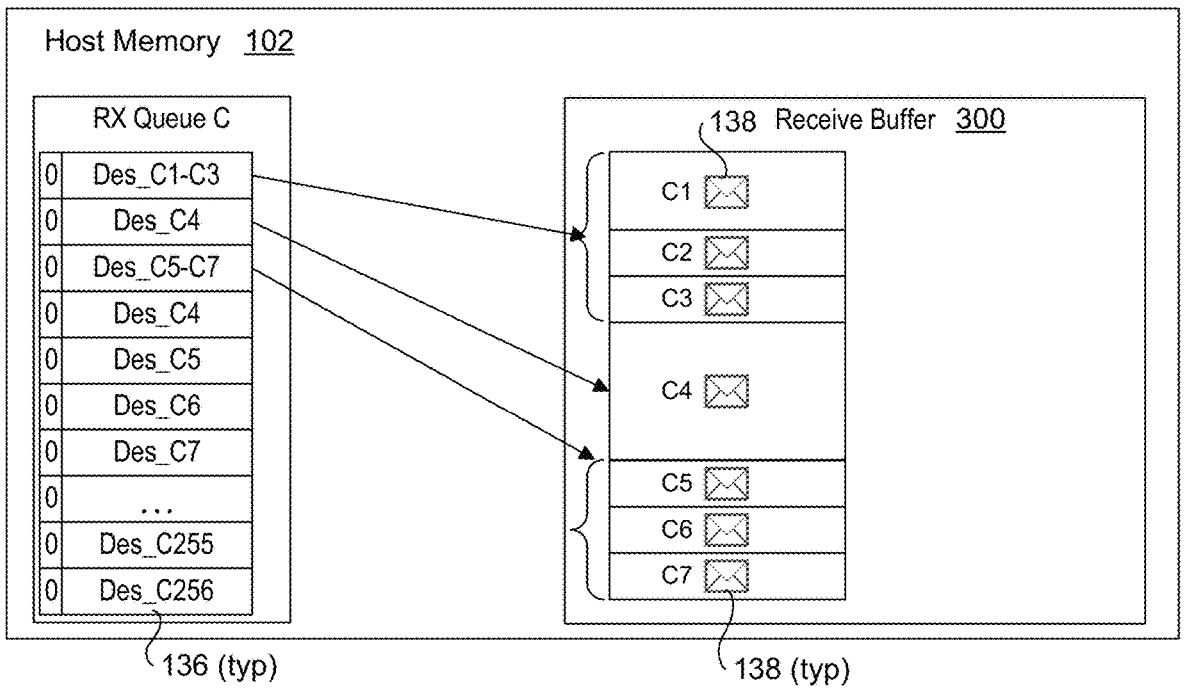
FIG. 3b is a diagram illustrating a second descriptor enqueuing and packet data storage scheme under which some descriptors are associated with multiple packets while other descriptors are associated with single packets.

Also, for illustrative purposes a descriptor 136 and corresponding packet data 138 are shown as occupying the same row in the figures herein, as if the descriptor and packet data are stored together in host memory 102. In practice, the descriptors and packet data will usually be stored in different portions of host memory 102. Generally, the descriptors will have a fixed size (or otherwise fit in RX queue slots having a fixed size), while the size of the packets (and associated packet data) may vary and be significantly larger than the descriptors. Exemplary configurations associating descriptors with packets are shown in FIGS. 3a and 3b, as described below.

FIG. 1 also shows Receive Event Queues (REQ)s 122b, 124b, and 126b, which are respectively associated with interrupt vectors X, Y, and Z and also labeled and referred to herein as REQ-X, REQ-Y and REQ-Z. As explained in further detail below, an REQ is used to enqueue "events" which contain information relating to interrupt events or causes generated by individual RX queues within the pool of RX queues associated with the interrupt vector for the REQ.

Generally, each RX queue and REQ illustrated herein may be implemented using various known techniques. For example, in one embodiment, the RX queues A-L and/or the REQs are implemented as circular FIFO queues. In one embodiment, a "generation" bit is used (for status bit 140), wherein the generation value is flipped following each iteration through the queue. In one embodiment, Head and Tail pointers are used to track the positions of the current slots accessed by software and hardware when reading from or writing to an RX queue.

Figure 2:
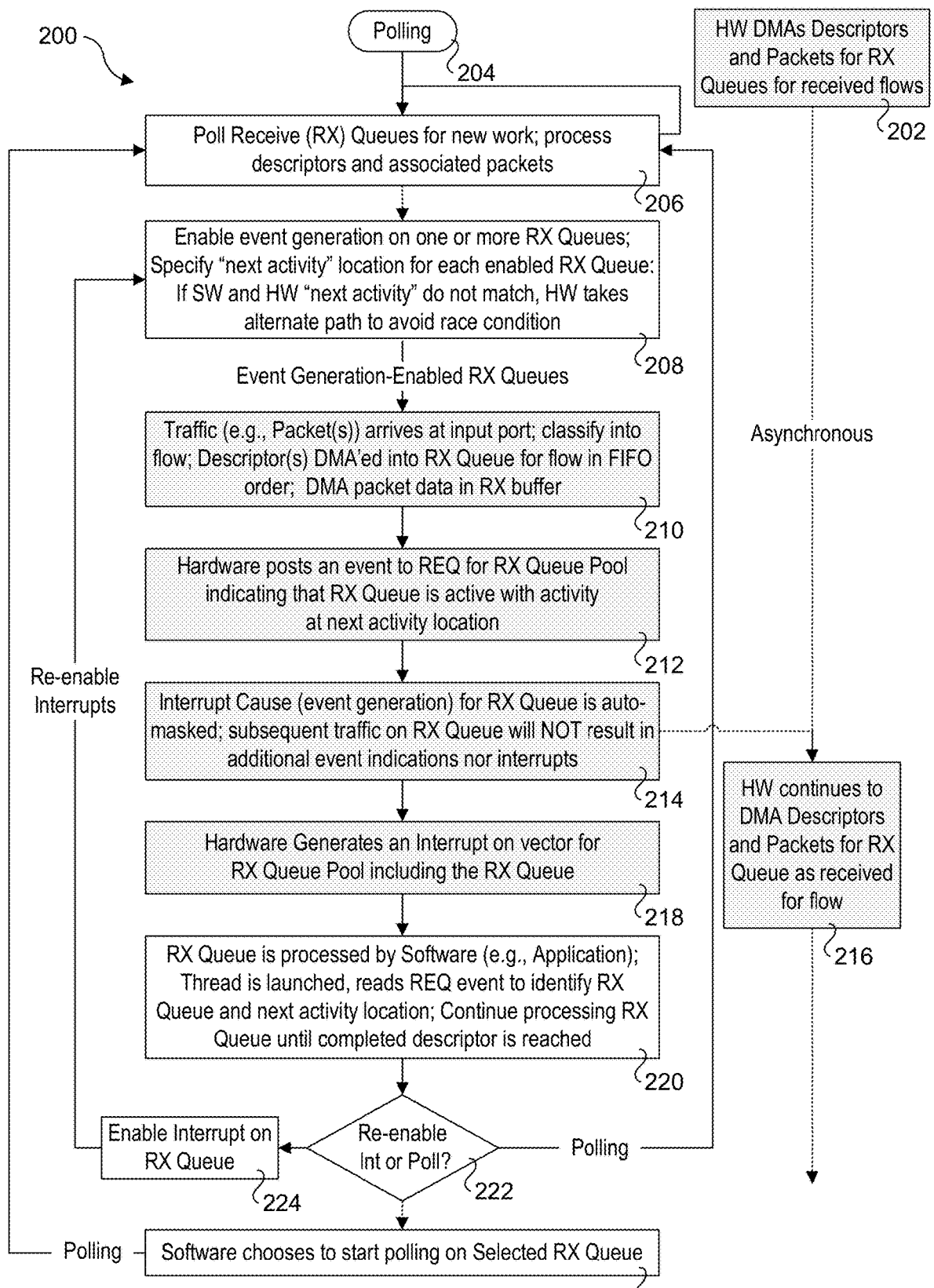
FIG. 2 is a flowchart illustrating operations and logic implemented by the platform of FIGS. 1 and 1a-1i, to perform packet processing on received packet flows, according to one embodiment.

FIG. 2 shows a flowchart 200 illustrating operations and logic employed by platform 100's software and hardware during packet processing operations. In FIG. 2, the operations shown in blocks with a white background are performed by software, while the operations shown in blocks with a light gray background are performed by hardware. It is further noted that some ongoing operations performed by software and hardware are asynchronous.

During ongoing operations, packets will be received at one or more ports by hardware (e.g., one or more of ports 106 on NIC 104). The packet data (header and payload) will be extracted and classified into flows for which associated RX queues in host memory 102 have been allocated. Descriptors for the packets will then be written to an appropriate Rx queue based on the packets' classified flow, while the packets' associated packet data will be written to RX buffers. In one embodiment, both enqueuing of descriptors and writing of packet data is performed using Direct Memory Access (DMA) transactions. In further detail, the hardware (e.g., NIC 104) will generate a descriptor and DMA the descriptor to a current descriptor slot in an RX queue. The packet data (also referred to and illustrated as packets herein) will be written to a location in host memory (e.g., a location in a receive buffer) identified by the descriptor for the packet. These operations are collectively depicted as being performed in a block 202 of flowchart 200.

In parallel (and asynchronously), software will process the packets in the RX queues by reading the descriptors and accessing the packet data at the addresses identified by the descriptors. As described below, the software may concurrently employ both a polling scheme and an interrupt-based scheme to process the descriptors enqueued by the hardware in the RX queues.

In the example of flowchart 200 the software begins using polling for all RX queues, as depicted in a start block 204. Under polling, the software will employ one or more threads to poll the various RX queues looking for new work to be performed (e.g., detect descriptors that have been enqueued by hardware and have yet to be processed by software), as depicted in a block 206. In one embodiment, new work can be detected by looking at the values of the status bits 140 (or generation bits) for each of the RX queues. For illustrative purposes and ease of explanation, in the Figures herein a status bit value of '1' indicates the presence of a descriptor that has been enqueued by hardware but has yet to be processed by software. A status bit value of '0' indicates the descriptor and associated packet data have been processed by software. For new work, in the examples illustrated and described herein the descriptors and associated packets will be processed by the software in FIFO order. As depicted by the loop back to block 206, the operations of block 206 are performed on an ongoing basis.

As depicted in a block 208, the software may selectively enable event generation on one or more RX queues. Generally, the software may employ various schemes for determining whether to enable event generation for a given RX queue (or group of RX queues) or continue polling that/ those RX queue(s). For example, the software may track access patterns of the various RX queues and/or detect the rates at which received packets are enqueued by hardware. Heuristics based on observed access patterns may also be used. Race condition Further details of the operations of block 208 are provided below. In one embodiment, the software also specifies a respective "next activity" location when enabling an RX queue for event generation, wherein the next activity location is used to identify the location of a next descriptor to be processed and prevent race conditions with hardware. As described in further detail below, if the "next activity" location for an RX queue specified by software (SW) does not match the next activity location maintained by hardware (HW), the hardware will take an alternate path to avoid a race condition. Further details of the operations of block 208 are provided below.

The operations in blocks 210, 212, 214, 216, and 218 are performed by hardware for event generation-enabled RX queues. In a block 210, traffic (e.g., packets) arrives at an input port and is classified into a flow using an applicable packet/flow classification scheme, as discussed above. In the illustrated embodiment, a descriptor will then be generated for each packet and the descriptor(s) for the packet(s) will be DMA'ed into the RX queue associated with the flow at a next location in FIFO order (the next location identifies the next slot in the RX queue at which the descriptor is to be enqueued). In conjunction with enqueueing descriptors, packet data for the packet(s) is DMA'ed in an RX buffer in host memory at an address identified by the packets' associated descriptors.

Generally, the operations in block 210 are similar to the ongoing operations performed in block 202 described above. However, for an event generation-enabled RX queue the logic will proceed to block 212 in which the hardware will post an event to the REQ for the RX queue pool (associated with the RX queue) indicating the RX queue is active with activity at a next activity location that has been previously generated by software and provided to the hardware, as described below. In a block 214 the interrupt cause (and corresponding generation of events) for the RX queue is automatically masked (auto-masked). As a result, enqueuing of descriptors for subsequent traffic destined for that RX queue will NOT result in additional event indications nor interrupts while the interrupt cause for the RX queue is masked. As depicted by a block 216, the hardware will continue to DMA descriptors in the RX queue asynchronously as additional packets for the flow are received (as well as DMA transferring the data for the packets in a receive buffer in host memory).

In block 218 the hardware generates an interrupt on the vector for the RX queue pool that includes the RX queue. In response, in a block 220 the RX queue is processed by the software (such as an application that consumes/processes the packets for the packet flow). This process begins with detection of the interrupt, launching of a thread by software to service the interrupt (or allocating an existing thread in an interrupt thread pool), with the thread reading the event from the REQ associated with the interrupt vector to identify the RX queue and the next activity location at which the next descriptor to be processed by software is enqueued. The software will then continue to process descriptors (beginning at the next activity location) until it reaches a descriptor slot with a status of '0' (or otherwise a generation bit indicating the descriptor in that descriptor slot has already been processed and thus there is no additional work to be performed). Generally, the software may return to polling mode or remain in interrupt-driven mode.

In a decision block 222 the software determines whether to re-enable interrupts for the RX queue or continue polling the queue. In response to a determination to re-enable interrupts for the RX queue, the interrupt on the RX queue that was auto-masked in block 214 is enabled in a block 224 and event generation to the REQ for the RX queue is re-enabled, as depicted by the left-hand loop back to block 208. If the software determines polling is to continue, the logic returns to block 206, resulting in the RX queue being polled (along with other RX queues that are being polled, as described above). As described below, while an RX queue is auto-masked (i.e., disabled for event generation), the software thread used to service the initial interrupt event may remain active in anticipation of hardware receiving a burst of traffic on a flow associated with the RX queue and enqueuing additional descriptors for that traffic to the RX queue.

As depicted by a block 226, during ongoing operations the software may decide to start polling on selected RX queues that are currently enabled for interrupts by changing the mode for those RX queues to polling, which disables interrupts for a selected RX queue. Various schemes may be used to determine when to disable interrupts for a given RX queue or multiple RX queues, such as timeout periods, observation of traffic patterns, heuristics, etc. As described above in block 208, the software can also selectively change the mode for one or more RX queues that are currently being polled from a polling mode to an interrupt-driven mode.

FIGS. 1a-1i depict various states (depicted at respective times) of platform 100 during processing of a packet stream 142 using the logic and operations of flowchart 200 (and/or including variations on those operations). For simplicity and illustrative purposes, each of RX queues A, B, C, and D in host memory 102 in FIG. 1a is depicted as beginning with no active entries (no existing descriptors or packets) using "0 . . . 0" for each entry. Also, the packets in packet stream 142 in FIGS. 1a-1i include a letter that identifies both the flow and the RX queue associated with that flow followed by a number indicating the sequence in the flow, wherein the first packet to be enqueued for a given flow begins with a sequence number of '1'—for illustrative purposes it will be presumed that all packets in packet stream 142 correspond to either packets flows that have been previously classified and have existing entries in flow table 120a in packet/flow classifier 118 or is among entries in flow table 120a that are prepopulated prior to processing such flows.

During ongoing operations, software will be operating in either a polling mode or an interrupt-driven mode for each RX Queue. There are two levels of interrupt state at the hardware level. At the interrupt level, the interrupt is either enabled or disabled (interrupts will generally be enabled during all of the situations described herein). Within the queue group associated with the interrupt, generation of events (which are also referred to as interrupt causes) may be selectively enabled or "masked" (i.e. disabled) for each individual RX queue. In the following example, each of RX Queues A, B, C, and D is initially operated in SW polling mode, as indicated by a box 121 with the letter 'P' in a box 121, while the initial operating mode of the hardware for Queues A, B, C, and D is event generation masked (Evt Masked), as depicted in interrupt vector pool configuration table 122a of FIG. 1a. As used herein, the letter 'I' in a box 121 indicates software is using an interrupt-driven mode for that RX Queue (see, e.g., RX Queue B of FIG. 1b).

FIG. 1a depicts a first state at time T1 under which a first descriptor DesB1 corresponding to a first packet B1 is enqueued in RX Queue B. Prior to descriptor DesB1 being enqueued, packet B1 is received at Port1, and buffered in RX buffer $108_1$. When packet B1 reaches the top of the queue, its header 114 is inspected (read), and a hash is performed on selected header fields as discussed above. The resulting hash is used as a lookup into flow table 120a, which finds a matching entry that identifies RX Queue B as the RX queue in which packet B1's descriptor is to be enqueued. For each RX queue, the hardware maintains information identifying the current descriptor slot along with a packet address in an RX buffer at which the data for current packet is to be written (not shown). Following classification, the hardware generates descriptor Des_B1 and uses DMA transactions to write a copy of descriptor Des_B1 into slot 1 of RX Queue B and a copy of the packet data for packet B1 beginning at the current address of the receive buffer for RX Queue B1. The current descriptor slot is then incremented by 1 and the current packet address in the receive buffer is offset based on the size of packet B1.

In conjunction with writing a new descriptor and packet data to an RX queue, the value of the status bit 140 for the descriptor is toggled from '0' to '1' to indicate the descriptor is new. In cases where generation bits are used, the value used by the generation bit to indicate whether a descriptor is new will alternate between '0' and '1' with each pass through the queue (both of which are tracked by the hardware and software) and the hardware will toggle the generation bit to the applicable value for the current pass through the queue. The use of a status bit or generation bit (or similar known scheme) may also be used to inform software that new work is available from hardware.

Figure 1B:
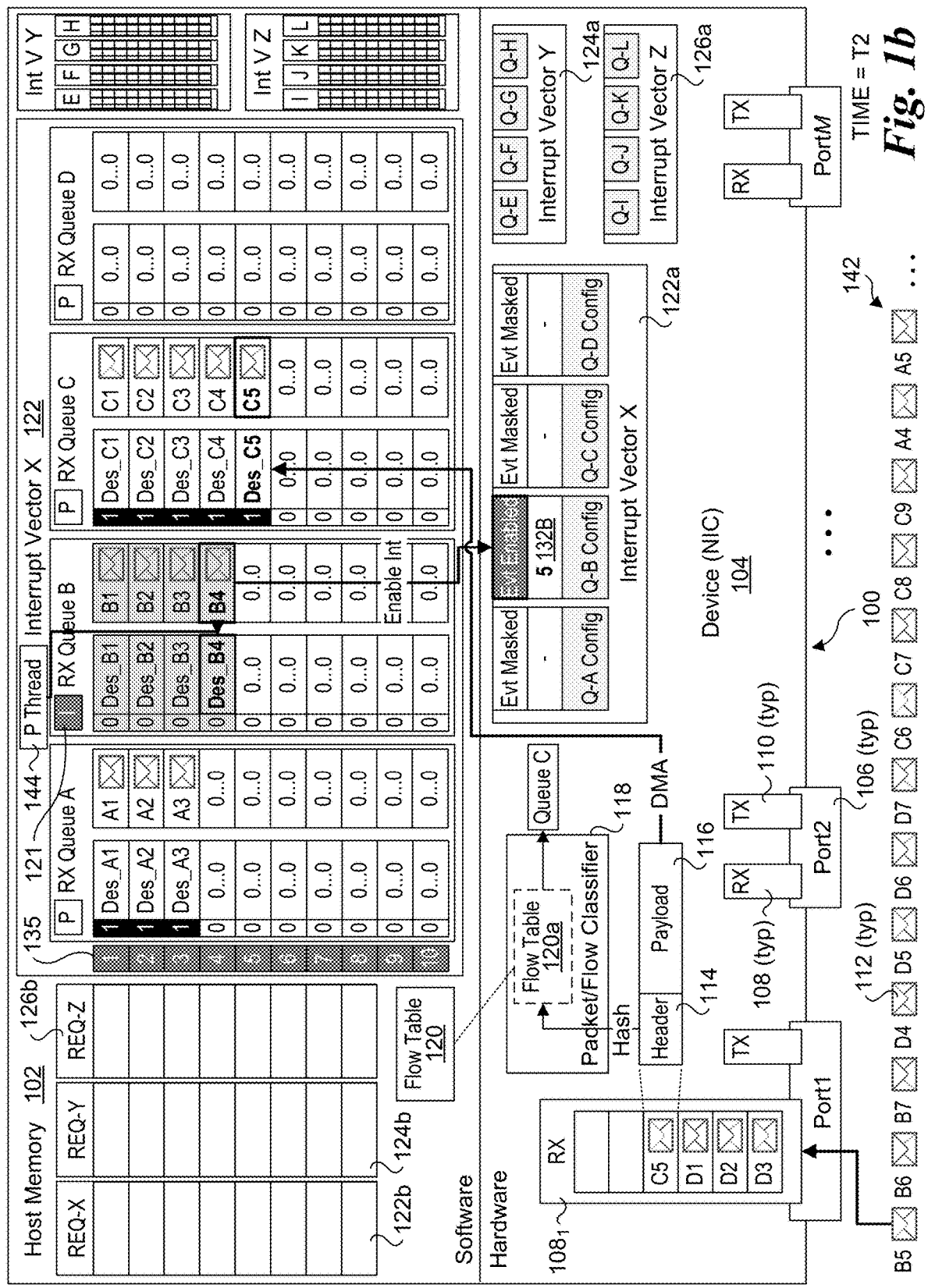
FIG. 1b is a schematic diagram illustrating the state of the platform of FIG. 1 at a second time T2.

FIG. 1b depicts the state of platform 100 at a second state corresponding to time T2. During the timeframe between times T1 and T2, packets B2, B3, B4, A1, A2, A3, C1, C2, C3, C4, and C5 are processed by hardware in a manner similar to that described above for packet B1. As before, a new descriptor for each packet will be enqueued in an applicable RX queue: RX Queue B for packets B2, B3, and B4; RX Queue A for packets A1, A2, and A3; and RX Queue C for packets C1, C2, C3, C4, and C5. The status bit for each new descriptor is also toggled from '0' to '1'.

As discussed above, the software and hardware perform operations in parallel (i.e., concurrently) and asynchronously. As shown in FIG. 1a and mentioned above, the SW mode for all of RX queues for the Interrupt Vector X RX queue pool at time T1 was polling. Accordingly, during the timeframe between times T1 and T2 software is polling various RX queues, including RX queues A-L using a polling thread 144, as well as potentially hundreds or thousands or more other RX queues that are not shown. (It is noted that software may employ multiple polling threads to poll multiple RX queues in parallel.) As illustrated in FIG. 1b, at some point during this time frame software will detect (using polling), the presence of each of descriptors Des_B1, Des_B2, Des_B3, and Des_B4 and process each of these descriptors. As each descriptor is processed, the status bit is toggled back from '1' to '0' to indicate the descriptor has been processed.

After processing descriptor Des_B4, software will inspect the status bit of the next descriptor, which is a '0' indicating it has previously been processed (or for a first time through an RX queue corresponds to a slot for which a descriptor has yet to be added). In the example of FIG. 1b, polling thread 144 (or some other software mechanism) enables interrupts on RX Queue B, as depicted by changing the mode for RX Queue B in the RX Queue B configuration information from Polling (in FIG. 1a) to Interrupt-driven (in FIG. 1b). Software also sends a next activity location of '5' to hardware, and a corresponding next activity location 132B for RX Queue B is set to '5'. Under the embodiment of flowchart 200, this next activity location is specified (by software) in block 208. Under embodiments employing Memory-mapped IO (MMIO), software may directly write data into hardware memory and/or registers configured to support MMIO access, and thus software may set the next activity locations directly rather than providing (sending) the next activity locations to hardware and have hardware write the values in the RX queue configuration table. In connection with enabling interrupts on RX Queue B, software also switches RX Queue B to an interrupt-driven mode, as depicted by a box 121 with the letter 'I'.

The next activity locations are used to prevent race conditions between hardware and software. Essentially, software is telling hardware, "this is where I expect the next descriptor to be enqueued." However, it is possible that the next descriptor for a given RX queue is "in-flight" in connection with a DMA write transaction issued by the hardware before the operational mode for the RX queue is changed to event generation-enabled, which may result in the hardware thinking its next activity location is different than where software expects it to be. When an event is enqueued in an REQ by hardware, the event identifies the next activity location for the applicable RX Queue that was provided by software. This next activity location is then used by software to locate the next descriptor to be processed and prevent a race condition. For example, if SW sets next activity to 5, but HW has already delivered 5, then it needs to immediately send an event to the event queue, and not leave the queue in interrupt enabled mode (since the packet at location 5 will potentially never be processed).

Figure 1C:
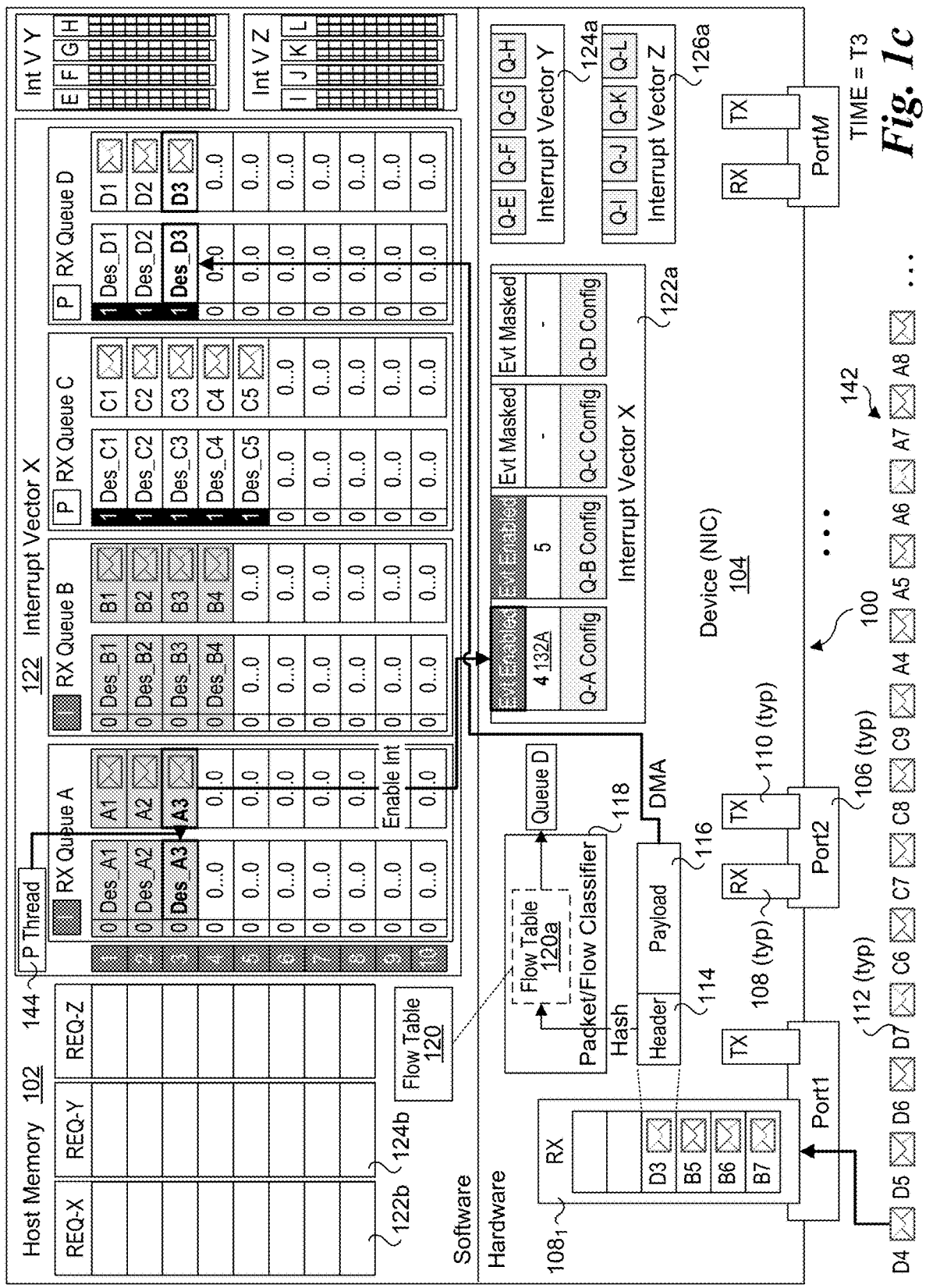
FIG. 1c is a schematic diagram illustrating the state of the platform of FIG. 1 at a third time T3.

FIG. 1c shows the state of platform 100 at a third state corresponding to time T3. During the timeframe between times T2 and T3 hardware has processed and enqueued packets D1, D2, and D3 and corresponding descriptors Des_D1, Des_D2, and Des_D3 in Rx queue D, and toggled the status bits for these descriptors to '1'. Meanwhile, software polling thread 144 has processed descriptors Des_A1, Des_A2 and Des_A3 and associated packets A1, A2, and A3 in RX Queue A. Polling thread 144 has also enabled event generation for RX Queue A and has set next activity 132A for RX Queue A to '4'. Thus, at time T3 generation of events are enabled for both RX queues A and B, while the SW modes for RX queues C and D continue to be polling with event generation being masked at the hardware level for RX queues C and D.

The capability to selectively enable event generation (aka interrupt causes) for individual queues within an interrupt vector RX queue pool supports enhanced performance when compared with schemes that map individual RX queues with individual interrupt vectors. It also enables a much larger number of RX queues to selectively implement an interrupt-driven mode rather than using a polling mode for those RX queues at the software level. This functionality is further facilitated through the use of REQ event entries, which enable an interrupt service thread to filter the RX queues associated with a given interrupt vector to detect which RX queue had an event that caused the interrupt vector to be asserted, which further enables software to service that event or interrupt cause.

Figure 1D:
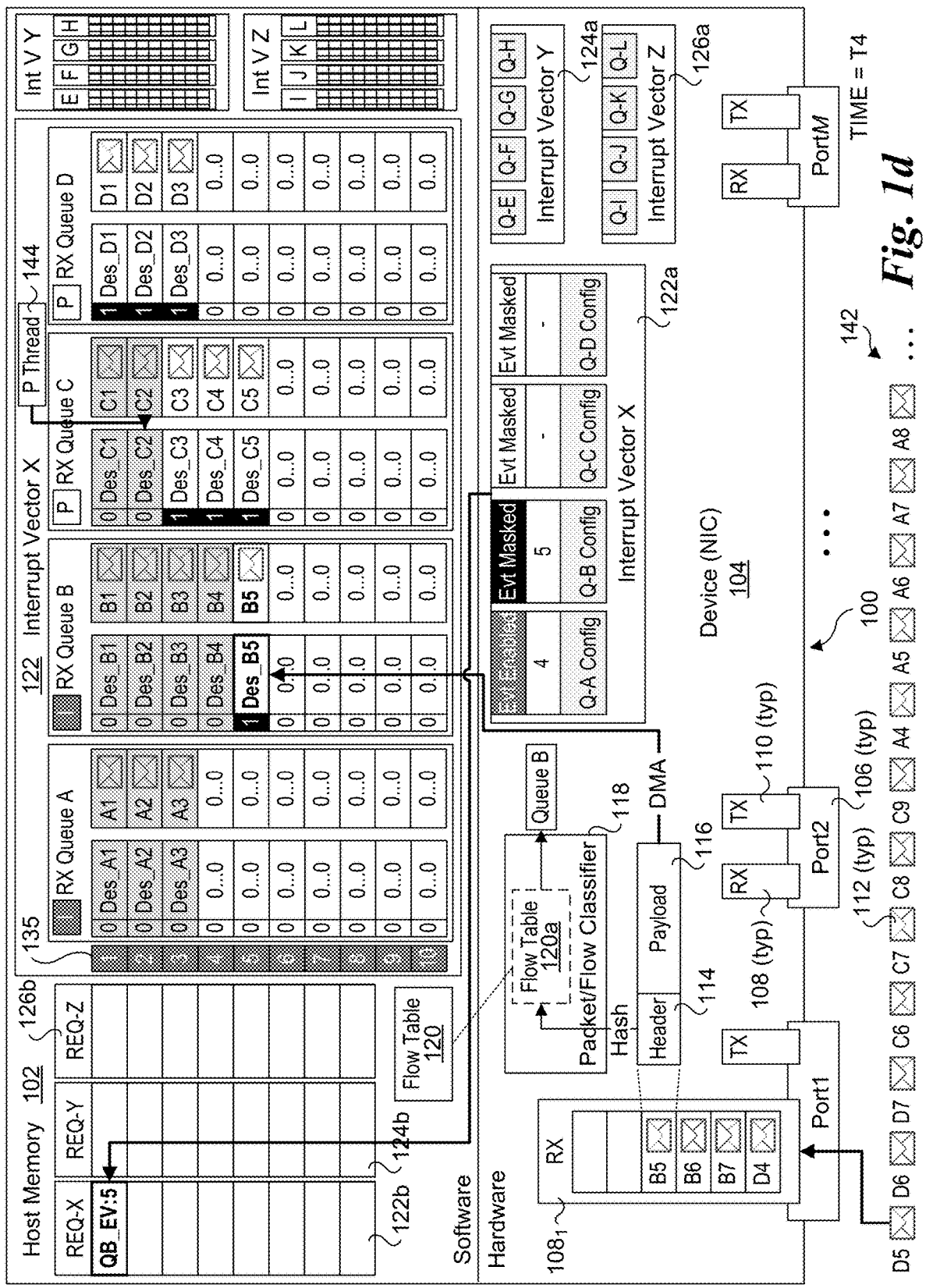
FIG. 1d is a schematic diagram illustrating the state of the platform of FIG. 1 at a fourth time T4.

An example of this is shown in FIG. 1d, which illustrates the state of platform 100 at a time T4. During the timeframe between T3 and T4, the hardware processes packet B5, which includes generation and enqueuing of descriptor Des_B5 and B5 packet data in RX Queue B. In accordance with block 212 of flowchart 200, the hardware (NIC 104)

posts an event to REQ-X indicating that RX Queue B is active with a next activity location of '5'. This is depicted by an event of QB_EV:5 in the first slot of the REQ-X queue 122*b* in FIG. 1*d*, wherein "QB_EV" means there is an event for RX Queue B and ":5" identifies the next activity location. In accordance with block 214 of flowchart 200, the hardware then automatically masks the interrupt cause (packet for flow B received and corresponding descriptor enqueued), as depicted by the Evt Masked mode for the RX Queue B configuration information in FIG. 1*d*. In accordance with block 216 of flowchart 200, the hardware then generates an interrupt on vector X, which is the interrupt vector for the RX queue pool to which RX Queue B belongs. In parallel during the timeframe between T3 and T4, polling thread 144 detects that new work is present in RX Queue C, and processes descriptors Des_C1 and Des_C2.

Figure 1E:
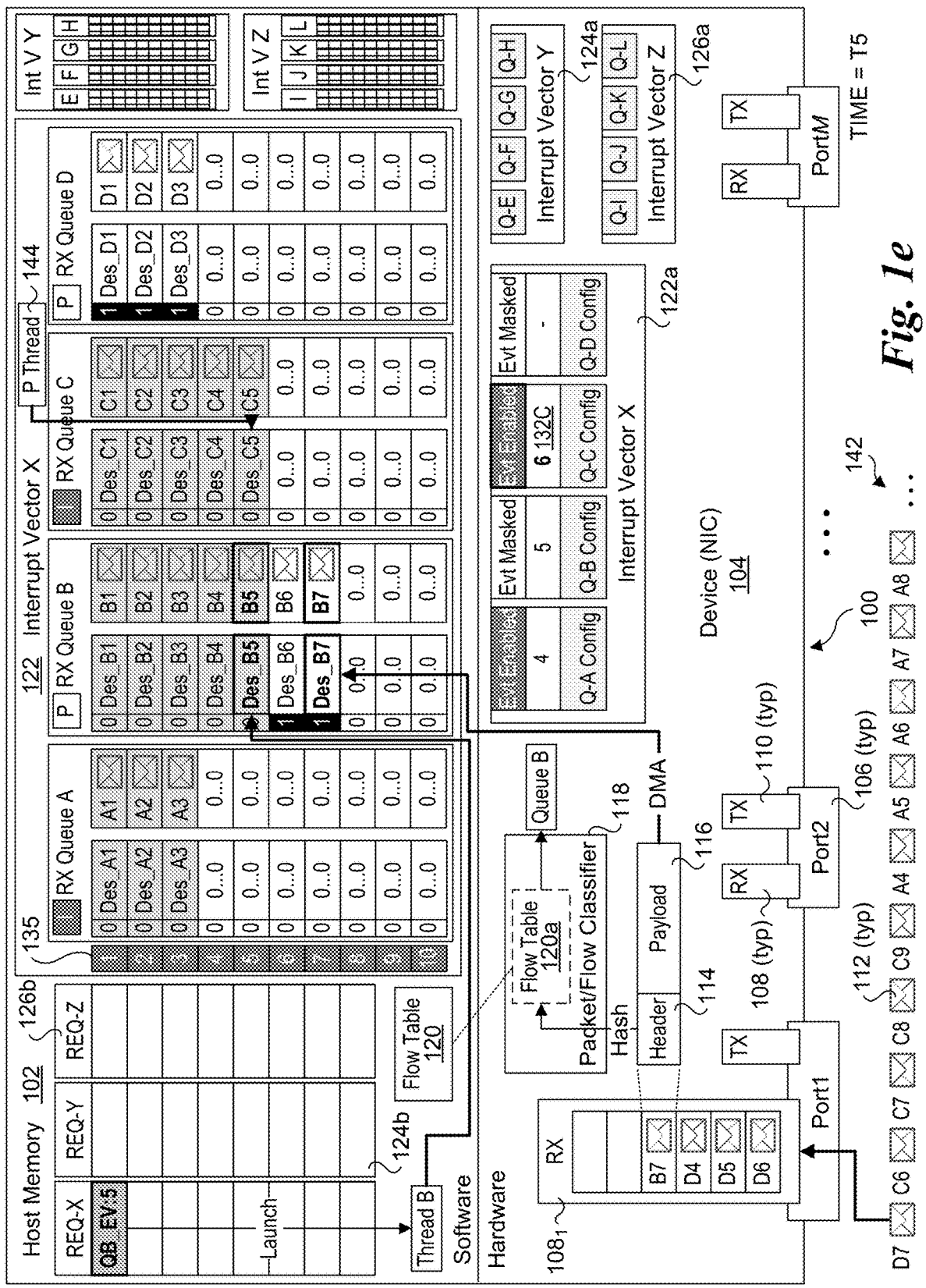
FIG. 1e is a schematic diagram illustrating the state of the platform of FIG. 1 at a fifth time T5.

In response to the interrupt on vector X, software will be notified that an interrupt on vector X has been asserted and an interrupt service thread or similar mechanism will be used to detect and process the QC_EV:5 event, as depicted by the state of platform 100 at time T5 in FIG. 1*e*. To handle the QB_EV:5 event, software launches a thread (Thread B) or otherwise uses an existing thread (such as a polled thread used to service interrupts) to process the descriptor located at the next activity location in the RX queue identified by the event, which corresponds to descriptor Des_B5 in slot 5 of RX Queue B. The software mode for RX Queue B is also switched back to polling.

In parallel during the timeframe between times T4 and T5, both software and hardware will perform additional operations. As shown in FIG. 1*e*, polling thread 144 will process descriptors Des_C3, Des_C4, and Des_C5 in RX Queue C. Meanwhile, in accordance with block 216 of flowchart 200, hardware will continue to DMA descriptors and packets for RX Queue B as packets for flow B are received and classified. This is depicted in FIG. 1*e* by hardware processing packets B6 and B7, generating descriptors Des_B6 and Des_B7, and enqueueing the descriptors and the packet data for packets B6 and B7 in RX Queue B. Also, at some point during the timeframe between times T4 and T5, the SW mode of RX Queue C is changed from polling to interrupt-driven, with the HW mode changed to event generation-enabled (Evt Enabled). In conjunction with this, software provides a next descriptor 132C having a location '6', which is written to the configuration table for RX Queue C.

As discussed above for block 214, since generation of events for RX Queue B is masked (having been auto-masked), hardware will not generate or enqueue any new events to REQ-X queue 122*b*, nor assert any new interrupts on vector X. Since interrupt handling entails significant overhead, this novel approach improves efficiency by eliminating multiple interrupts on RX Queue B. In one embodiment, while RX Queue B is in the event generation-masked mode, software Thread B (or another thread) may continue to poll RX Queue B and process any new descriptors that are added to RX Queue B by hardware.

An aspect of the concept behind this approach is that network traffic is often "bursty," meaning that a network port may receive a burst of traffic for one or more packet flows. For simplicity, the examples herein only depict a few packets for a given flow that are processed in sequence. In practice, a burst of packets for a given packet flow may entail tens or even hundreds of packets. Use of polling of large numbers of RX queues may generally be inefficient, as many if not most of the RX queues will not receive any traffic between polling cycles (for a given polling thread). Meanwhile, such polling may result in substantial cache thrashing since in order for a software thread to inspect a given RX queue, data from the queue needs to be copied from host memory into the L1 cache for the processor core running the software thread. In contrast, once a software thread has been launched to service an REQ event for a given RX queue, a burst of traffic on the flow associated with the RX queue can be handled more efficiently without 1) having to assert a subsequent interrupt when new traffic arrives for the flow/RX queue; and 2) knowing or anticipating that subsequent traffic for the flow will be added to the RX queue, thus increasing the polling hit rate.

Generally, software may re-enable event generation on a given RX queue and operate in an interrupt-driven mode or otherwise switch back to polling mode for the RX queue for a variety of reasons. For example, under one approach software may process a burst of traffic for a given RX queue, and subsequently observe that no additional traffic has been added to the RX queue for some predefined time period (or otherwise based on some sort of scheme or the like that may consider usage patterns for one or more RX queues and/or using heuristics). In the case of a one-off burst (meaning a single burst of traffic for a given flow would arrive at a hardware port), it may be advantageous to re-enable event generation for the RX queue or return to the polling mode, or possibly first re-enable event generation and subsequently return to polling mode after a second timeout period during which no traffic is received for the RX queue. In other cases, a "conversation" is maintained between a server and client, where the client sends communications to the server, and in response the server returns communications to the client. For example, HTTP (HyperText Transport Protocol) is premised on a Request/Response paradigm involving the exchange of communications between clients and servers, where some or many of the communication may comprise a burst of traffic. Thus, upon detection of such a traffic flow pattern, it may be advantageous to process the packets for each burst, and then re-enable event generation between bursts.

Figure 1F:
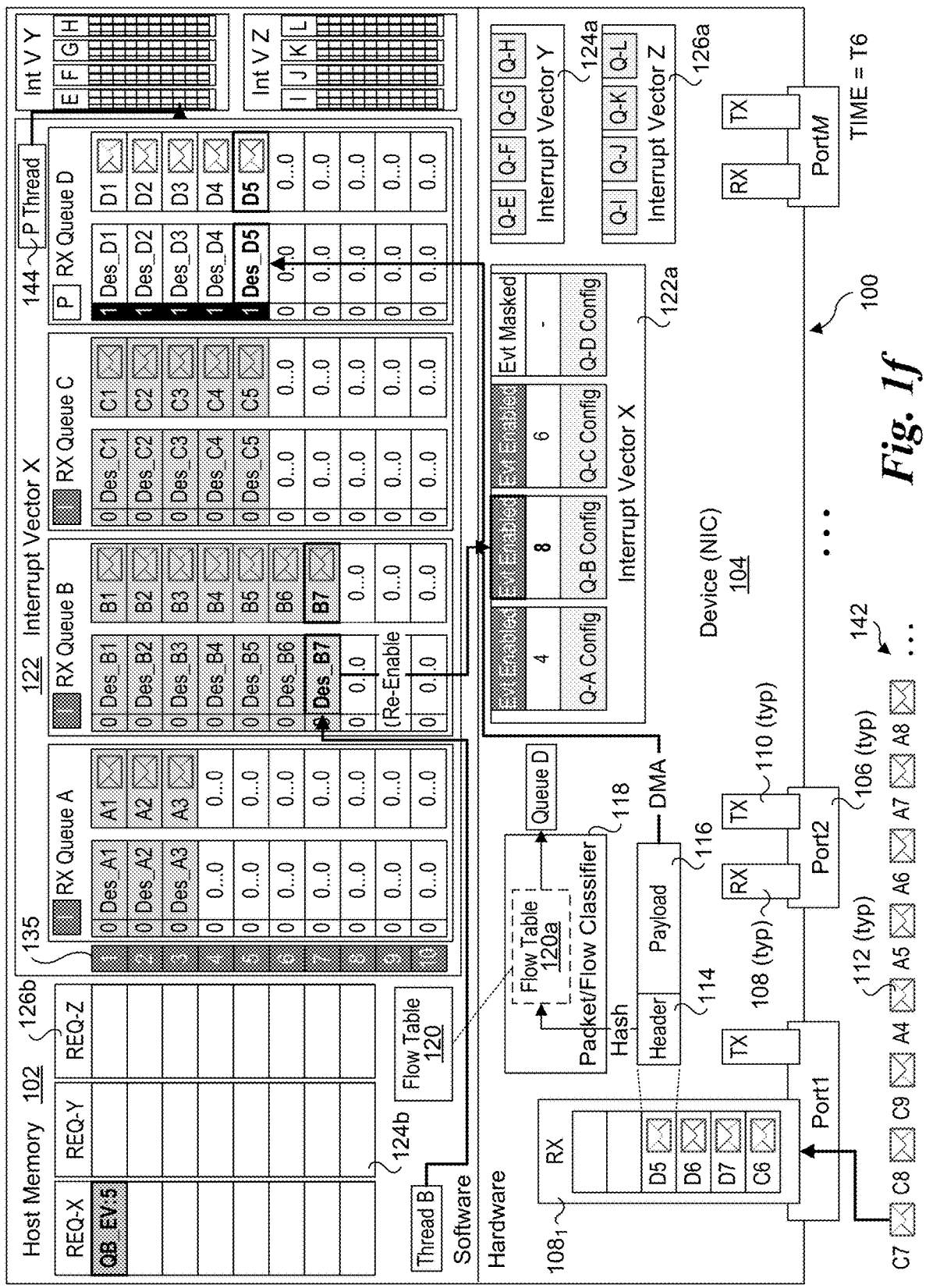
FIG. 1f is a schematic diagram illustrating the state of the platform of FIG. 1 at a sixth time T6.

FIG. 1*f*, which depicts the state of platform 100 at a time T6, illustrates an example of software re-enabling interrupts on RX Queue B. During the timeframe between times T5 and T6, Thread B processes descriptors Des_B6 and Des_B7, and then detects that Des_B7 is the last descriptor that has been enqueued by hardware for the flow. After a predetermined timeout period (for example), Thread B re-enables event generation for RX Queue B, and updates the next activity location for RX Queue B to '8'. Generally, after re-enabling event generation on an RX queue, a thread that was used to process descriptors in the queue may be released, or otherwise may be placed in an idle state (e.g., for implementations that employ a pool of threads for servicing interrupts that are re-used rather than launching a new thread to service each new REQ event).

In parallel with the operations of Thread B, during the time period between times T5 and T6 hardware has received an enqueued packets D4 and D4 and associated descriptors Des_D4 and Des_D5 for RX Queue D. Meanwhile, polling thread 144 is performing packet processing on packets in RX queue E (details of which are not shown).

Figure 1G:
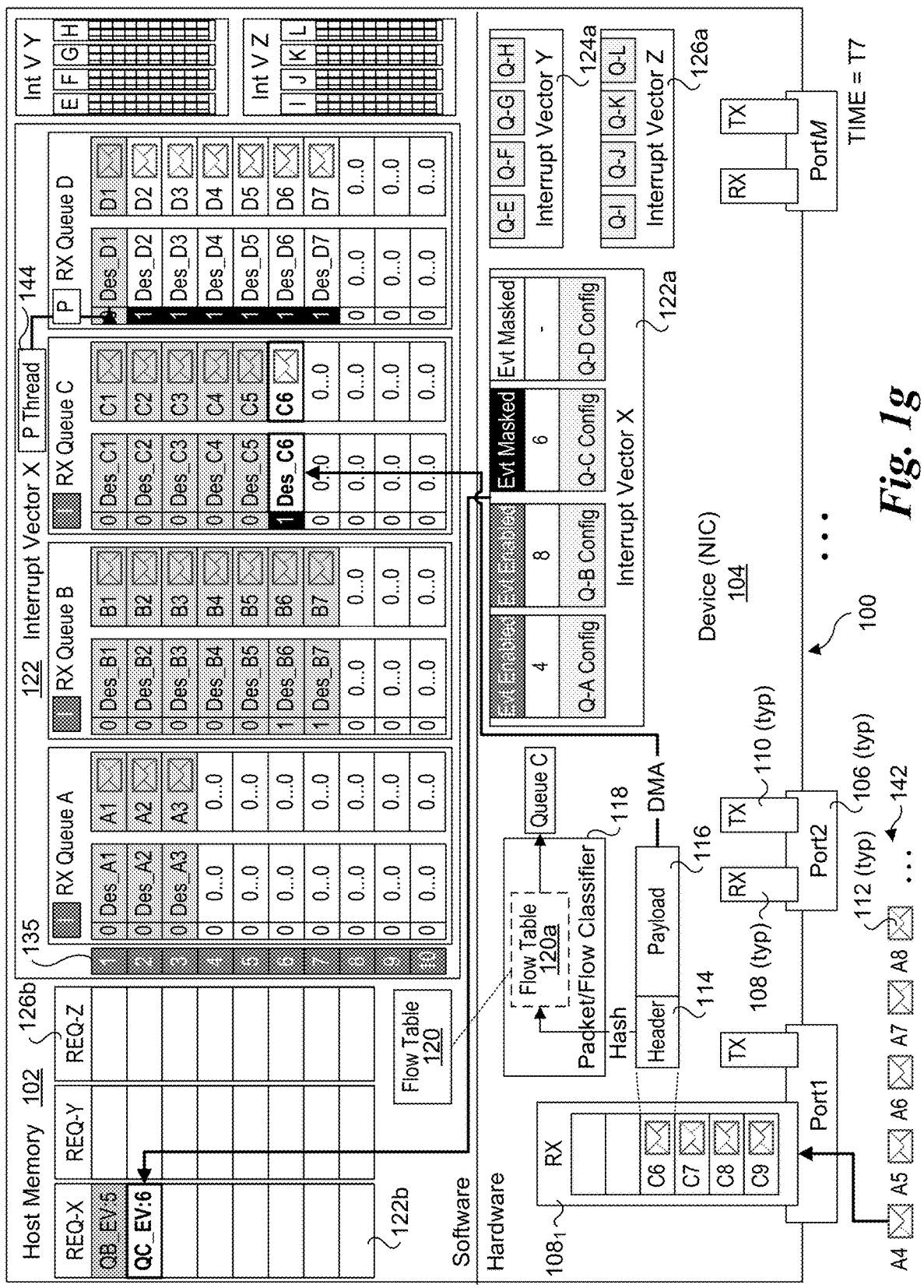
FIG. 1g is a schematic diagram illustrating the state of the platform of FIG. 1 at a seventh time T7.

The state of platform 100 at a time T7 is depicted in FIG. 1*g*. During the timeframe between times T6 an T7, packet C6 is processed, which includes generation and enqueuing of descriptor Des_6 and C6 packet data in RX Queue C. In accordance with blocks 212, 214, and 216 of flowchart 200, the hardware (NIC 104) posts a QC_EV:6 event to REQ-X queue 122*b* indicating that RX Queue C is active with a next activity location of '6', automatically masks the interrupt cause (packet for flow C received and descriptor enqueued), as depicted by the Int Masked mode for the RX Queue C configuration information, and then generates an interrupt on vector X. which is the interrupt vector for the RX queue pool to which RX Queue B belongs. In parallel during the timeframe between times T6 an T7, polling thread 144 detects that new work is present in RX Queue D, and processes descriptor Des_D1.

Figure 1H:
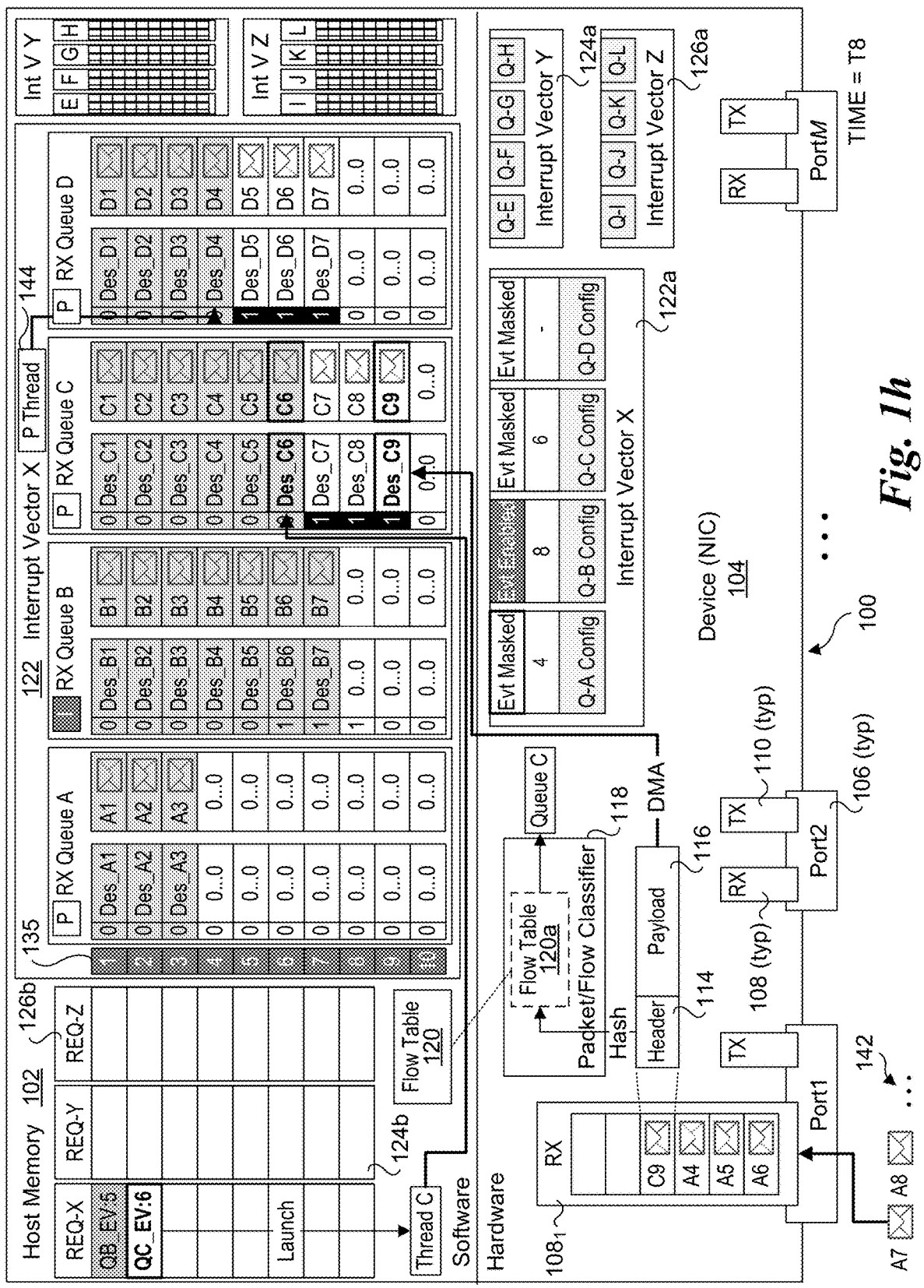
FIG. 1h is a schematic diagram illustrating the state of the platform of FIG. 1 at a eighth time T8.

In response to the interrupt of vector X, software will be notified that an interrupt on vector X has been asserted and an interrupt service thread or similar mechanism will be used to detect and process the QC_EV:6 event, as depicted by the state of platform 100 at time T8 in FIG. 1h. To handle the QC_EV:6 event, software launches a Thread C (or otherwise uses an existing thread) to process the descriptor located at the next activity location in the RX queue identified by the event, which corresponds to descriptor Des_C6 in slot 6 of RX Queue C.

In parallel during the timeframe between times T7 and T8, polling thread 144 will process descriptors Des_D2, Des_D3, and Des_D4 in RX Queue D. Meanwhile, hardware will continue to DMA (and enqueue) descriptors for RX Queue C and DMA packet data in an applicable receive buffer using DMA transactions as packets for flow C are received. This is depicted in FIG. 1h by hardware processing packets C7, C8, and C9, generating descriptors Des_C7, Des_C8, and Des_C9, and enqueueing the descriptors and the packet data for packets C7, C8, and C9 in RX Queue C.

Also, at some point during the timeframe between times T7 and T8 the mode of RX Queue A is changed from interrupt-driven back to polling, such as depicted in block 226 of flowchart 200. In this example, software has detected there has been no activity on RX Queue A for some non-activity threshold, and thus has determined to switch the mode on RX Queue A back to polling in consideration of the lack of activity on RX Queue A.

Figure 1I:
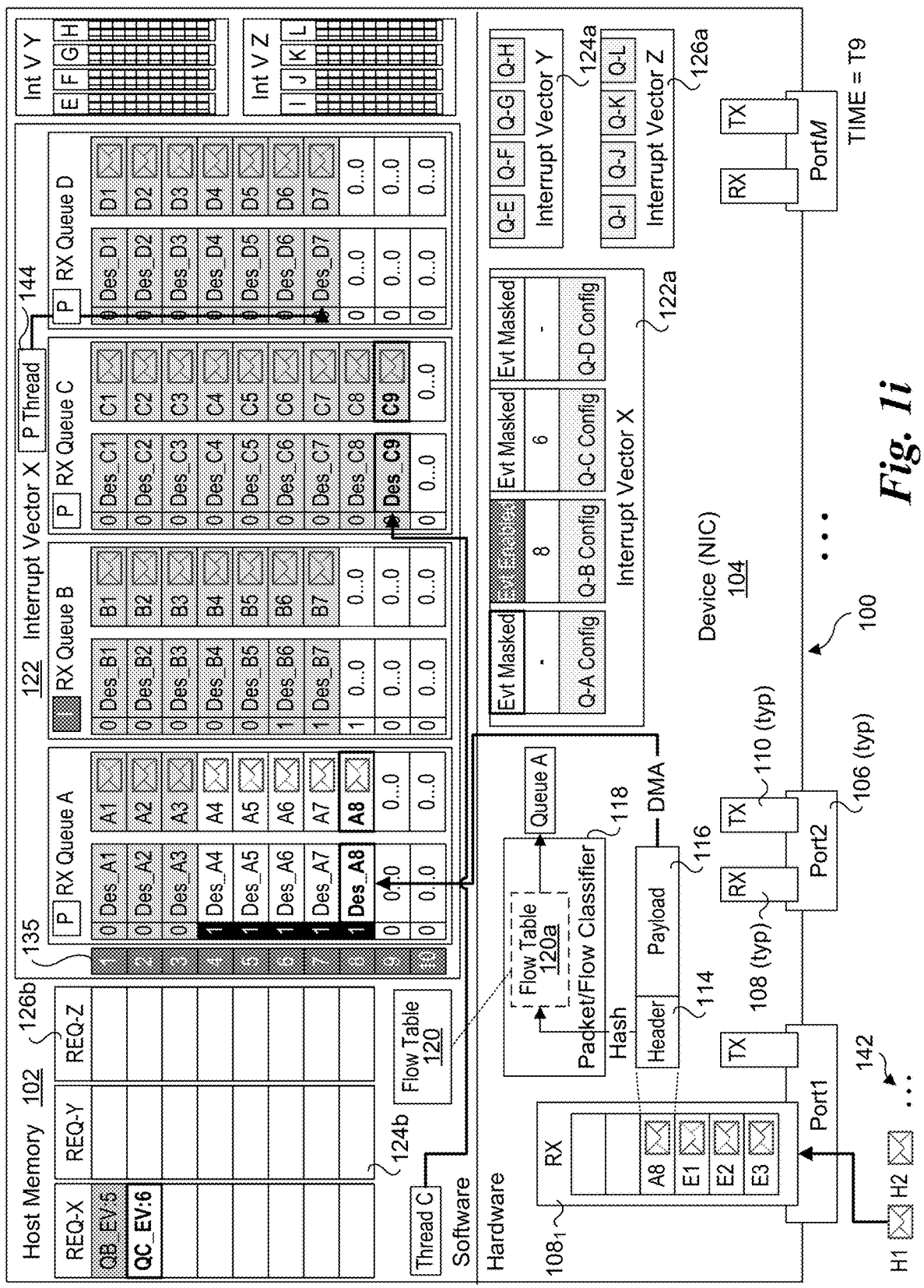
FIG. 1i is a schematic diagram illustrating the state of the platform of FIG. 1 at a ninth time T9.

The state of platform 100 at a time T9 is depicted in FIG. 1i. During the timeframe between times T8 and T9 Thread C has processed descriptors Des_C7, Des_C8, and Des_C9 associated with respective packets C7, C8, and C9 in RX Queue C. In parallel, polling thread 144 has processed descriptors Des_D5, Des_D6, and Des_D7 associated with packets D5, D6, and D7 in RX Queue D. Meanwhile, the hardware has classified packets A4, A5, A6, A7 and A8 of flow 'A' and generated and enqueued associated descriptors Des_A4, Des_A5, Des_A6, Des_A7, and Des_A8 in RX Queue A. Since RX Queue A has been returned to polling mode (see FIG. 1h above), an event will not be added to REQ 122a, nor will an interrupt be asserted by the hardware. It is further noted that RX Queue C remains masked for event generation at Time T9.

As discussed above, the embodiments depicted in FIGS. 1, and 1a-1i depict packet data (as labeled packets) being logically within the various RX queues for illustrative purposes an ease of understanding. In practice, it will be more likely that the packet data will be stored in receive buffers that are separate from the RX queues.

For example, two examples of implementations under which descriptors are enqueued in RX queues while the packet data associated with the descriptors are written to separate receive buffers are shown in FIGS. 3a and 3b. FIG. 3a shows an implementation under which there is a descriptor generated and enqueued for each packet in a given flow. As before, the descriptors 136 are enqueued in an RX queue (e.g., RX Queue C) in host memory 102, while the packet data for the packets associated with descriptors 136 are written to address spaces or blocks in one or more receive buffers 300 in host memory 102. As illustrated, the size of various packets received for a given flow may vary. Generally, a descriptor for a given packet may include a pointer to the memory and/or block address to which packet data for the packet are stored. Although the packet header in most protocols includes information from which the size of a packet can be derived, the descriptor under the embodiment of FIG. 3a will generally include information identifying the packet size, although may not.

Under the configuration of FIG. 3b, some of the descriptors are associated with coalesced packets (that is the data for multiple packets are coalesced into a single packet), while other descriptors are associated with single packets. In the case of multiple packets, the descriptor might include a pointer to the address of the first packet in a sequence of packets associated with the descriptor, along with a length of the sequence of packets (e.g., in Bytes).

In addition to the descriptor and associated packet data enqueuing and storage schemes described and illustrated herein, other schemes know in the art may be used. More generally, the particular scheme used for enqueuing descriptors and buffering packet data associated with the descriptors is outside the scope of this disclosure.

Figure 4:
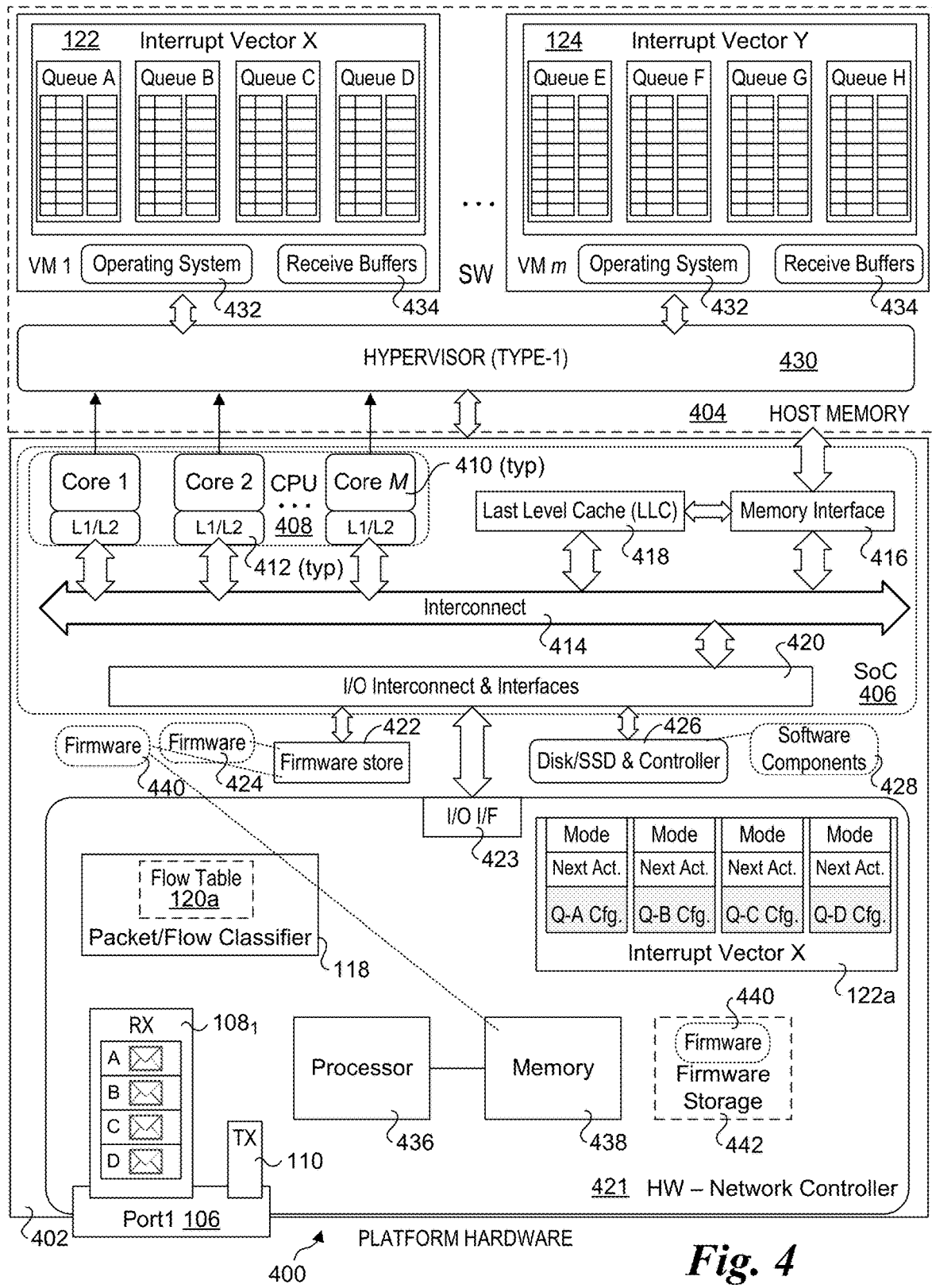
FIG. 4 is a schematic diagram of a platform architecture configured to host a plurality of virtual machines in which RX queues and receive buffers are implemented, and a network controller configured to implement the hardware device operations of FIGS. 1, 2, and 1a-1i, according to one embodiment.

FIG. 4 shows one embodiment of a platform architecture 400 corresponding to a computing platform suitable for implementing aspects of the embodiments described herein. Architecture 400 includes a hardware layer in the lower portion of the diagram including platform hardware 402, and a software layer that includes software components running in host memory 404.

Platform hardware 402 includes a processor 406 having a System on a Chip (SoC) architecture including a central processing unit (CPU) 408 with M processor cores 410, each coupled to a Level 1 and Level 2 (L1/L2) cache 412. Each of the processor cores and L1/L2 caches are connected to an interconnect 414 to which each of a memory interface 416 and a Last Level Cache (LLC) 418 is coupled, forming a coherent memory domain. Memory interface is used to access host memory 404 in which various software components are loaded and run via execution of associated software instructions on processor cores 410.

Processor 406 further includes an Input/Output (I/O) interconnect hierarchy, which includes one or more levels of interconnect circuitry and interfaces that are collectively depicted as I/O interconnect & interfaces 420 for simplicity. Various components and peripheral devices are coupled to processor 406 via respective interfaces (not all separately shown), including a network controller 421 via an I/O interface 423, a firmware storage device 422 in which firmware 424 is stored, and a disk drive or solid state disk (SSD) with controller 426 in which software components 428 are stored. Optionally, all or a portion of the software components used to implement the software aspects of embodiments herein may be loaded over a network (not shown) accessed, e.g., by network controller 421. In one embodiment, firmware 424 comprises a BIOS (Basic Input Output System) portion and additional firmware components configured in accordance with the Universal Extensible Firmware Interface (UEFI) architecture.

During platform initialization, various portions of firmware 424 (not separately shown) are loaded into host memory 404, along with various software components. In architecture 400 of FIG. 4 the software components include a Type-1 hypervisor 430, also known as a "bare-metal" hypervisor. Optionally, a Type-2 hypervisor may be used (not shown). One of the primary differences between a Type-1 hypervisor and a Type-2 hypervisor is the Type-2 hypervisor is implemented as an application running on host operating system, while in a Type-1 hypervisor the hypervisor runs directly on the platform hardware without a host operating system (i.e., it runs on the "bare metal" of the platform, hence the name).

Under platform architecture 400, each of m virtual machines (VMs) VM 1 . . . VM m includes an operating system 432 and receive buffers 434. For illustrative purposes, RX queues A, B, C, and D for interrupt vector pool 122 (associated with interrupt vector X) are depicted in the memory space of VM 1, while RX queues E, F, G, and H for interrupt vector pool 124 (associated with interrupt vector Y) are depicted in the memory space for VM m. This is to show that pools of RX queues may be distributed across more than one VM for platform architectures that employ VMs. Platform architecture employing containers, such as Docker-type containers, may be implemented in a similar manner. In addition, computing platforms that only run a single instance of an operating system may also be used.

In FIG. 4, a portion of the circuitry and logic for implementing the hardware device functionality of FIGS. 1, 1a-1i and 2 described above includes a processor 436, coupled to memory 438, and firmware 440 that is executed on processor 436. Generally, firmware 440 may be stored on-board network controller 421, such as in a firmware storage device 442, or loaded from another firmware storage device on the platform external to network controller 421 during pre-boot, such as from firmware store 422.

Figure 4A:
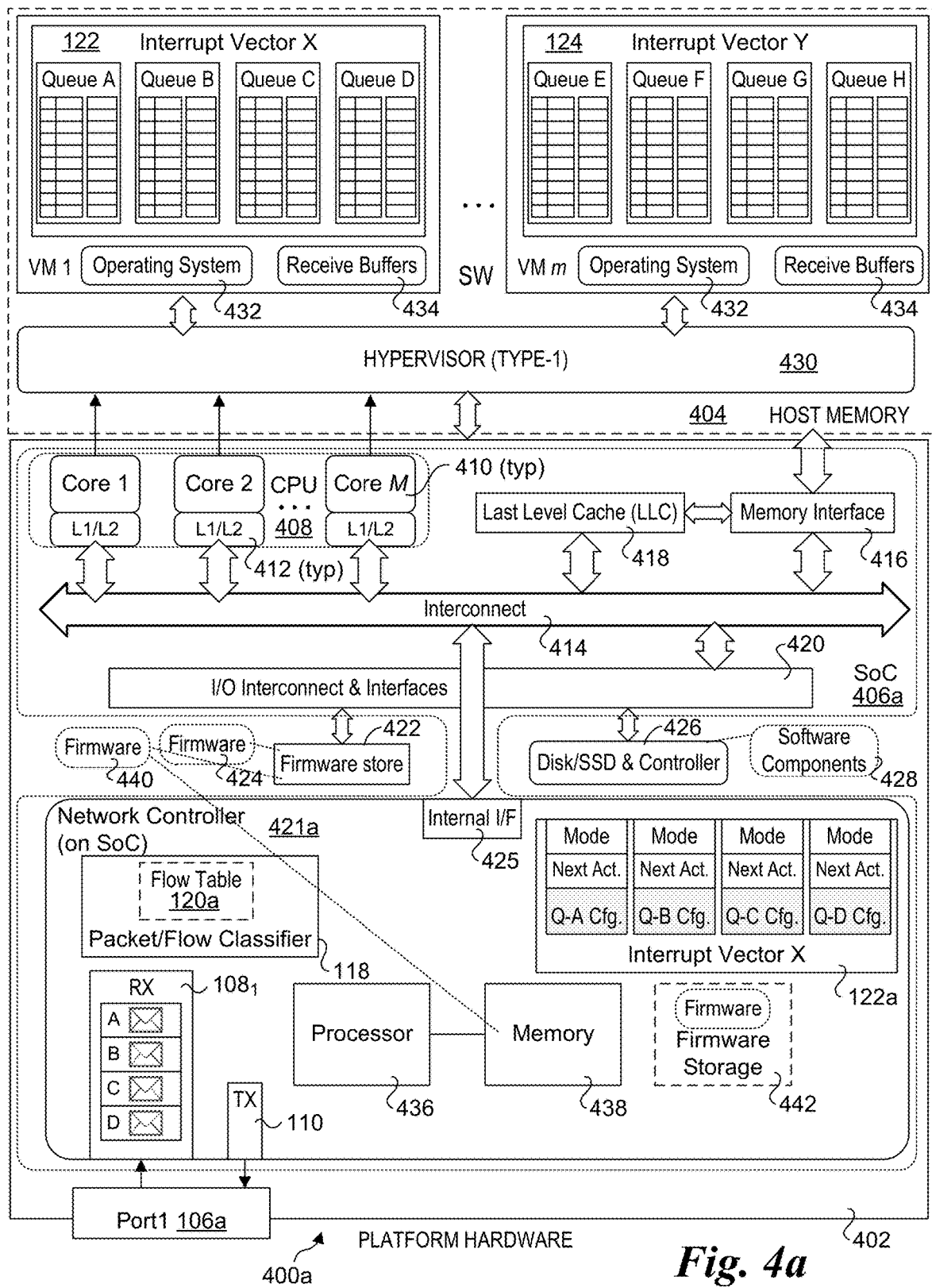
FIG. 4a is a schematic diagram of a platform architecture similar to that shown in FIG. 4 in which the network controller is integrated in the SoC.

FIG. 4a shows a platform architecture 400a including an SoC 406a having an integrated network controller 421a configured in a similar manner to network controller 421 in platform architecture 400, with the following differences. Since network controller 421a is integrated in the SoC it includes an internal interface 425 coupled to interconnect 414 or another interconnect level in an interconnect hierarchy (not shown). RX buffer $108_1$ and TX buffer 110 are integrated on SoC 406A and are connected via wiring to port 106a, which is a physical port having an external interface. In one embodiment, SoC 406a further includes I/O interconnect and interfaces and platform hardware includes firmware, a firmware store, disk/SSD and controller and software components similar to those shown in platform architecture 400.

The CPUs 408 in SoCs 406 and 406a may employ any suitable processor architecture in current use or developed in the future. In one embodiment, the processor architecture is an Intel® architecture (IA), including but not limited to an Intel® x86 architecture, and IA-32 architecture and an IA-64 architecture. In one embodiment, the processor architecture is an ARM®-based architecture.

As discussed above, the hardware devices disclosed herein may include but are not limited to network adapters, network controllers or NICs, InfiniBand HCAs, and host fabric interfaces (HFIs). Under some embodiments, the network adaptors, controllers, and NICs are configured to be implemented using one or more Ethernet protocol defined by IEEE 802.3-based protocols. Other types of protocols may also be used, as will be recognized by those having skill in the networking arts.

Figure 5:
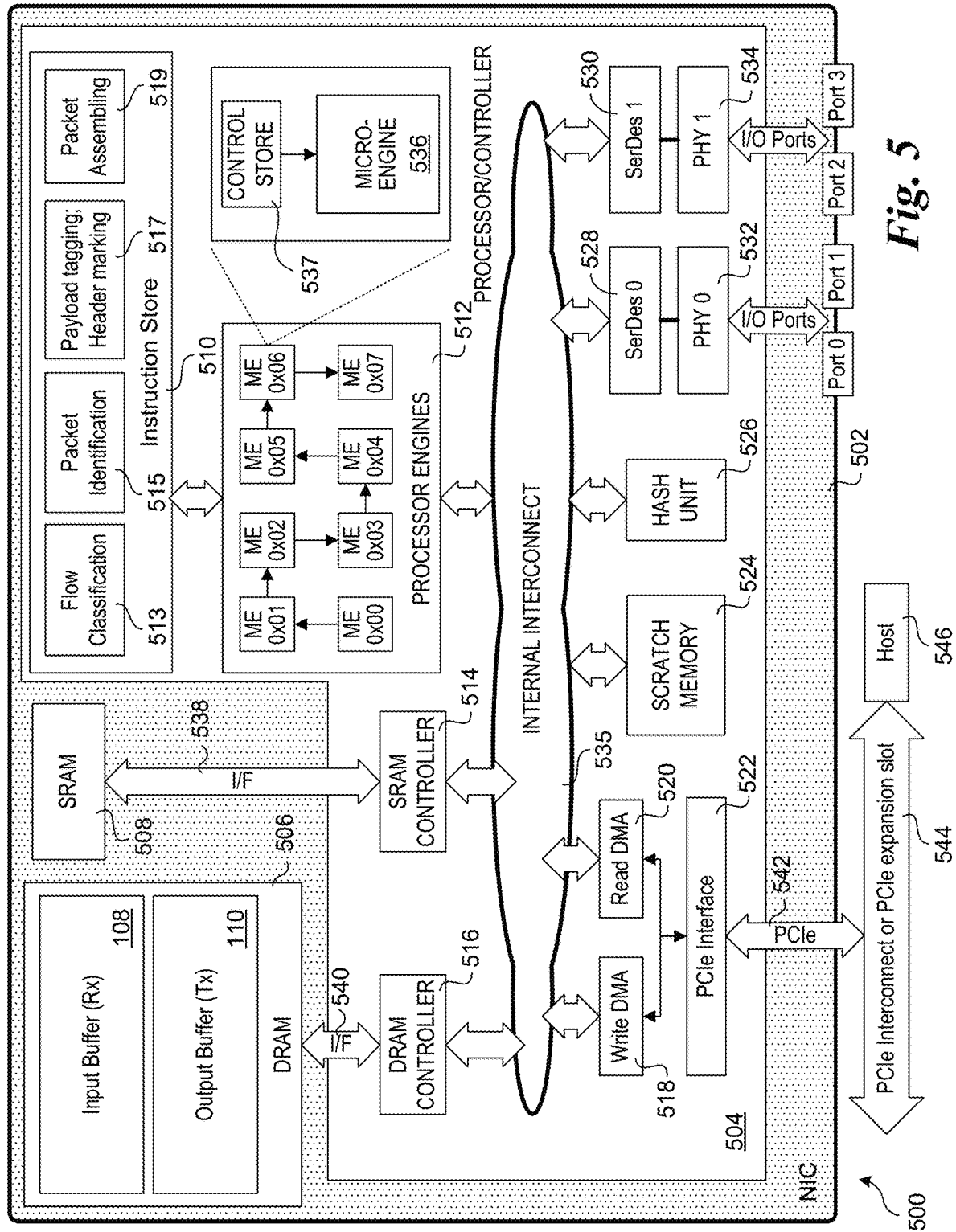
FIG. 5 is a schematic diagram illustrating an architecture for a NIC that may be used for implementing aspects of the hardware devices disclosed herein, according to one embodiment.

An exemplary system architecture for a NIC 500 is shown in FIG. 5. NIC 500 includes a NIC system board 502 on which a network processor/controller 504, Dynamic Random Access Memory (DRAM) 506 and Static Random Access Memory (SRAM) 508 are mounted. Under various embodiments. NIC system board 502 is representative of an Ethernet controller card, a daughter board, a multi-chip module board or substrate, or it may be part of a computer system board, such as a main board or motherboard for a computer server. Processor/controller 504 is representative of Ethernet processing and/or control unit, and may be embodied in various forms, including as an Ethernet controller chip or a network processor unit (NPU).

In the illustrated embodiment, processor/controller 504 includes an instruction store 510, a cluster of processor engines 512, an SRAM controller 514, a DRAM controller 516, a Write DMA block 518, a Read DMA block 520, a PCIe interface 522, a scratch memory 524, a hash unit 526, Serializer/Deserializers (SerDes) 528 and 530, and PHY interfaces 532 and 534. Each of the components is interconnected to one or more other components via applicable interconnect structure and logic that is collectively depicted as an internal interconnect cloud 535.

Instruction store 510 includes various instructions that are executed by processor engines cluster 512, including Flow Classification instructions 513, Packet Identification instructions 515, Payload tagging and Header marking instructions 517, and Packet Assembling instructions 519. Processor engines cluster 512 includes a plurality of microengines 536, each coupled to a local control store 537. Under one embodiment, various operations such as packet identification and flow classification are performed using a pipelined architecture, such as illustrated in FIG. 5, with each microengine performing an associated operation in the pipeline. As an alternative, processor engines cluster 536 is representative of one or more processor cores in a central processing unit or controller. As yet another option, the combination of processor engines 512 and instruction store 510 may be implemented as embedded logic, such as via a Field Programmable Gate Arrays (FPGA) or the like.

In one embodiment, instruction store 510 is implemented as an on-chip store, such as depicted in FIG. 5. Optionally, a portion or all of the instructions depicted in instruction store 510 may be stored in SRAM 508 and accessed using SRAM controller 514 via an interface 538. SRAM 508 may also be used for storing selected data and/or instructions relating to packet processing operations.

DRAM 506 is used to store one or more Input (RX) Buffers 108 and one or more Output Buffers 110, and is accessed using DRAM controller 516 via an interface 540. Write DMA block 518 and Read DMA block 520 are respectively configured to support DMA Write and Read operations in accordance with the embodiments described herein. In the illustrated embodiment, DMA communication between DRAM 506 and a platform host circuitry is facilitated over PCIe interface 522 via a PCIe link 542 coupled to a PCIe interconnect or PCIe expansion slot 544, enabling DMA Write and Read transfers between DRAM 506 and system memory for a host 546 using the PCIe protocol.

In addition to PCIe, other interconnect technologies and protocols may be used. For example, these include but are not limited to Computer Express Link (CXL), InfiniBand, and Omni-Path.

Scratch memory 524 and hash unit 526 are illustrative of components employed by NICs for facilitating scratch memory and hashing operations relating to packet processing. For example, as described above a hash operation may be implemented for deriving flow IDs and for packet identification. In addition, a hash unit may be configured to support crypo-accelerator operations.

PHYs 532 and 534 facilitate Physical layer operations for the NIC, and operate as a bridge between the digital domain employed by the NIC logic and components and the analog domain employed for transmitting data via electrical, optical or wired signals. For example, in the illustrated embodiment of FIG. 5, each of PHYs 532 and 534 is coupled to a pair of I/O ports configured to send electrical signals over a wire cable such as a Cat6e or Cat6 Ethernet cable. Optical and wireless signal embodiments would employ additional circuitry and interfaces for facilitating connection via optical and wireless signals (not shown). In conjunction with PHY operations, SerDes 528 and 530 are used to serialize output packet streams and deserialize inbound packet streams.

In addition to the instructions shown in instruction store 510, other instructions may be implemented via execution of processor engines 512 or other processing means to facilitate additional operations. For example, in one embodiment, NIC 500 is configured to implement a TCP/IP stack on the NIC itself. NIC 500 may also be configured to facilitate TCP operations in a manner that is offloaded from the Operating System TCP facilities, whereby once a packet is sent outbound, NIC 500 is responsible for processing an ACK message and resending the packet if an ACK message is not received within an applicable TCP timeout value.

Generally, a NIC may be configured to store routing data for facilitating packet identification and flow classification, including forwarding filters and rules either locally or using a memory-mapped IO (MMIO) address space in system or host memory. When stored locally, this routing data may be stored in either DRAM 506 or SRAM 508. Routing data stored in a MMIO address space may be accessed by NIC 500 via Read DMA operations. Generally, setting up MMIO address space mapping may be facilitated by a NIC device driver in coordination with the operating system. The NIC device driver may also be configured to enable instructions in instruction store 510 to be updated via the operating system. Optionally, the instructions in instruction store may comprise firmware instructions that are stored in non-volatile memory, such as Flash memory, which may either be integrated on processor/controller 504 or mounted to NIC system board 502 (not shown).

Figure 6A:
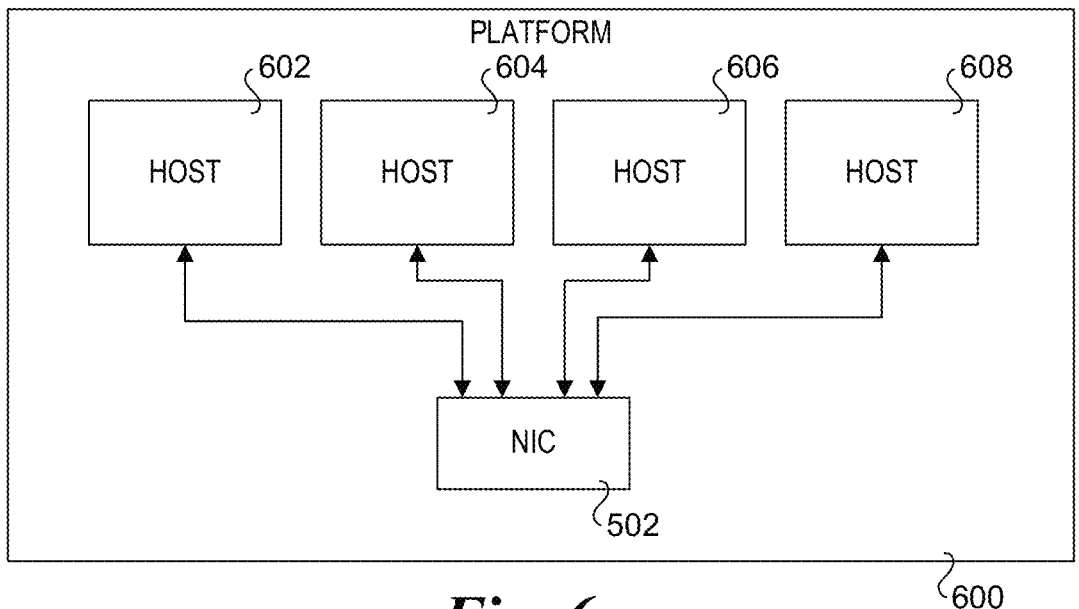
FIG. 6a is a schematic diagram illustrating a NIC coupled to a plurality of hosts in a platform.

In addition to a network controller or NIC being connected to a single host, the network controller or NIC may be connected to multiple hosts. For example, FIG. 6a shows a platform 600 including a NIC 502 connected to each of hosts 602, 604, 606, and 608. In one embodiment, when connected to multiple hosts, NIC 502 includes a separate set of interrupt vector pool configuration tables for each host.

Figure 6B:
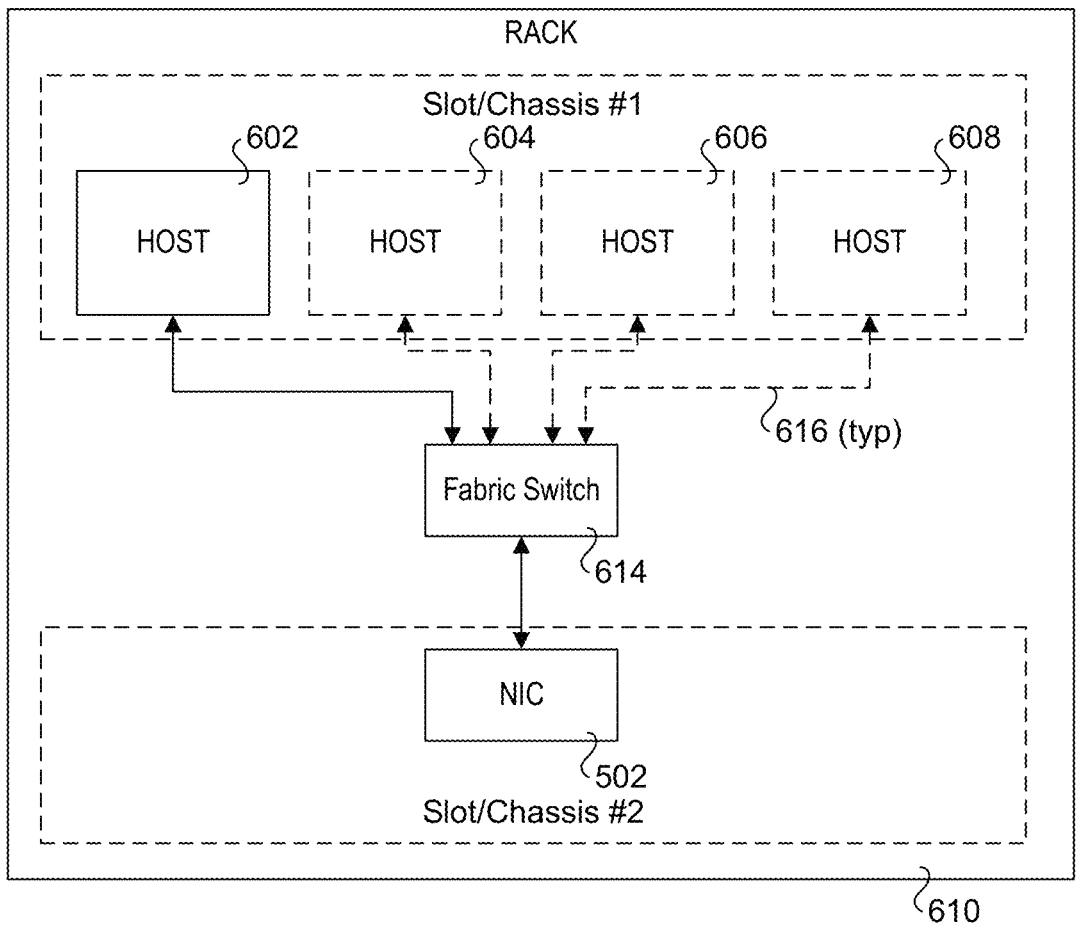
FIG. 6b is a schematic diagram illustrating a NIC in a first slot or chassis of a rack coupled in communication with one or more hosts in a second slot or chassis of the rack via a fabric.

As shown in FIG. 6b, a NIC can be installed in a rack in a slot, chassis, tray or sled that is separate from a slot, chassis, tray or sled in which one or more hosts connected to the NIC are installed. In this example, NIC 502 is installed in a slot or chassis #2 in a rack 610 including multiple slots. One or more hosts 602, 604, 606, and 608 are installed in a slot or chassis #1. NIC 502 is coupled in communication with one or more of hosts 602, 604, 606, and 608 via a fabric switch 614 and fabric links 616. In other embodiments, a NIC may be coupled in communication with a host in a separate slot or chassis via a point-to-point link. In still other embodiments, a NIC may be coupled in communication with a host in a separate rack (not shown).

Figure 7:
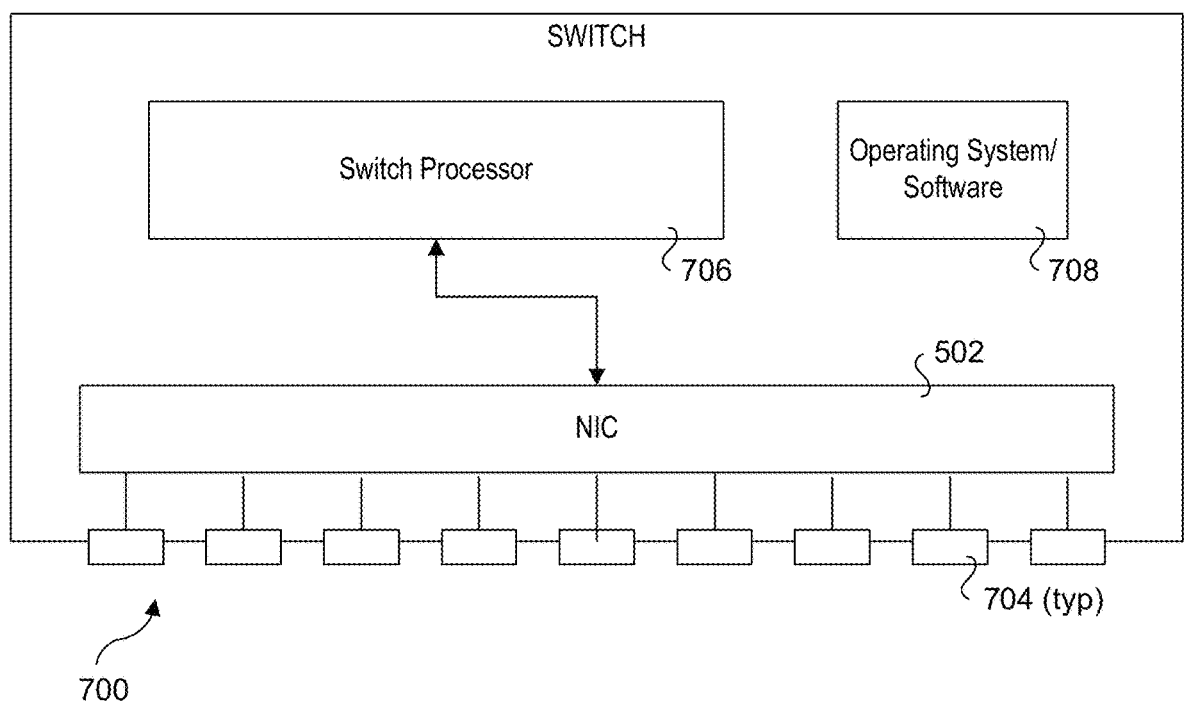
FIG. 7 is a schematic diagram illustrating implementation of a NIC in a switch.

The teachings and principles disclosed herein may also be implemented in a switch. For example, FIG. 7 shows a switch 700 including a NIC 502 connected to multiple switch ports 704 and to a switch processor 706. An operating system or other software 708 is executed on switch processor 706 to effect operations similar to those performed by the OS kernel protocol stack (or other operating system components) in the embodiments described above.

In general, the circuitry, logic and components depicted in the figures herein may be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to Application Specific Integrated Circuits (ASICs), FPGAs, IP block libraries, or through one or more of software or firmware instructions executed on one or more processing elements including processors, processor cores, controllers, microcontrollers, microengines, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', 'n', 'M', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by a general-purpose processor, or an embedded processor or the like. Thus, embodiments of this invention may be used as or to support a software program, software modules, firmware, and/or distributed software executed upon some form of processor, processing core or embedded logic, including a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a host computing platform including a processor and host memory and a hardware device having one or more ports configured to receive packets from one or more networks, the method comprising:
    implementing a plurality of receive (RX) queues in the host memory in which descriptors generated by the hardware device are enqueued;
    logically partitioning the RX queues into one or more pools, each RX queue pool associated with a respective interrupt vector;
    implementing one or more receive event queues (REQ) in the host memory, each REQ associated with a respective RX queue pool and associated interrupt vector;
    selectively enabling event generation for one or more of the plurality of RX queues;
    in response to a cause of a first event associated with a first RX queue for which event generation is enabled,
        enqueuing a first event in a first REQ associated with a first interrupt vector and the first RX queue, the first event including information used to service the first event;
        asserting a first interrupt using the first interrupt vector; and
        accessing the first event from the first REQ in response to the first interrupt to service the first event.

2. The method of claim 1, further comprising:
receiving, at a port of the hardware device, a stream of packets belonging to one or more packet flows; and
performing flow classification of the packets that are received at the port, generating descriptors associated with the received packets, and enqueuing the descriptors in one or more of the plurality of RX queues based on the packet flows to which the packets associated with the descriptors are classified, the enqueuing of descriptors including enqueuing a descriptor in the first RX queue for a packet classified to a first packet flow, wherein enqueuing a descriptor in the first RX queue while event generation is enabled for the first RX queue is a cause of the first event.

3. The method of claim 2, further comprising:
masking generation of events on the first RX queue;
while generation of events on the first RX queue is masked,
    enqueuing descriptors for packets received for the first flow in the first RX queue without enqueuing any additional entries in the first REQ nor asserting any interrupts associated with enqueuing descriptors in the first RX queue.

4. The method of claim 1, wherein the first event enqueued in the first REQ identifies the first RX queue and a location in the first RX queue in which a next descriptor to be processed in enqueued.

5. The method of claim 1, further comprising:
prior to selectively enabling event generation on the first RX queue, employing a software polling mode for the first RX queue to process descriptors enqueued in the first RX queue.

6. The method of claim 5, further comprising:
processing descriptors that have been enqueued by hardware in the first RX queue in a First-In First-Out (FIFO) order;
determining a next activity location in the first RX queue corresponding to a FIFO slot at which a next descriptor is to be processed; and
sending or writing information to the hardware instructing the hardware to switch to an event generation-enabled mode for the first RX queue, the information including the next activity location.

7. The method of 6, further comprising:
switching an operational mode for the first RX queue on the hardware device from an event generation-masked mode to the event generation-enabled mode;
enqueuing a descriptor at the next activity location in the first RX queue;
enqueuing the first event in the first REQ, wherein the first event includes information identifying the first RX queue and the next activity location.

8. The method of claim 7, further comprising servicing the first event by accessing the first event from the first REQ, identifying the first RX queue using information in the first event, and processing the descriptor at the next activity location in the first RX queue identified by the first event.

9. The method of claim 7, further comprising:
enqueuing a second event in the first REQ, the second event including information identifying a second RX queue in the first RX queue pool for which interrupts are enabled and a next activity location in the second RX queue;
asserting a second interrupt using the first interrupt vector;
in response to the second interrupt, accessing the second event from the first REQ, identifying the second RX queue using information in the second event, and processing a descriptor at the next activity location in the second RX queue identified by the second event.

10. The method of claim 1, further comprising switching a software mode for one or more RX queues that are operating in an interrupt-driven mode to a polling mode.

11. An apparatus configured to be installed in a computing platform including a host processor and host memory in which a plurality of receive (RX) queues, a plurality of receive event queues (REQs), and one or more RX buffers are implemented, the plurality of RX queues logically partitioned into a plurality of RX queue pools, each RX queue pool associated with a respective interrupt vector, each REQ associated with a respective RX queue pool and associated interrupt vector, the apparatus comprising:
one or more ports configured to receive packets from one or more networks;
an input/output (I/O) interface to facilitate communication between the computing platform and the apparatus when the apparatus is installed in the computing platform and operating; and
circuitry to,
perform classification of packets received at the one or more ports, the classification associating each classified packet with an RX queue;
generate descriptors associated with the classified packets, each descriptor identifying a location of one or more classified packets in an RX buffer in the host memory;
enqueue the descriptors in the plurality of RX queues, and write packet data for one or more packets associated with each given descriptor at the location in an RX buffer identified by the descriptor;
implement an event generation-enabled mode for a first RX queue;
detect a cause of a first event;
enqueue a first event in a first REQ in the host memory associated with the first interrupt vector and the first RX queue, the first event including information pertaining to the first event; and
assert a first interrupt using the first interrupt vector.

12. The apparatus of claim 11, wherein the circuitry is further configured to:
perform flow classification of packets in a stream of packets belonging to one or more packet flows that are received at a first port;
generate descriptors associated with the received packets; and
enqueue the descriptors in one or more of the plurality of RX queues based on the packet flows to which the packets associated with the descriptors are classified, the enqueuing of descriptors including enqueuing a descriptor in the first RX queue for a packet classified to a first packet flow,
wherein enqueuing a descriptor in the first RX queue while generation of events is enabled for the first RX queue is a cause of the first event.

13. The apparatus of claim 12, wherein the circuitry is further configured to:
mask generation of events on the first RX queue;
while generation of events on the first RX queue is masked,
enqueue descriptors for packets received for the first flow in the first RX queue without enqueuing any additional events in the first REQ nor asserting any interrupts associated with enqueuing descriptors in the first RX queue.

14. The apparatus of claim 13, wherein the first event enqueued in the first REQ identifies the first RX queue and a next activity location in the first RX queue in which a next descriptor to be processed by software executing on the host processor is enqueued.

15. The apparatus of claim 14, wherein the circuitry is further configured to:
enqueue a second event in the first REQ, the second event including information identifying a second RX queue in the first RX queue pool for which generation of events is enabled and a next activity location in the second RX queue; and
assert a second interrupt using the first interrupt vector.

16. The apparatus of claim 11, wherein the circuitry is further configured to:
implement a plurality of operational modes on each of a plurality of RX queues on an individual basis;
prior to enabling generation of events on the first RX queue, implement an event generation-masked mode on the first RX queue; and in response to receiving an instruction from software executing on the host processor to switch to an event generation-enabled mode for one or more RX queues including the first RX queue, switching from the event generation-masked mode to the event generation-enabled mode for the one or more RX queues.

17. The apparatus of claim 16, wherein the instruction received from software is an instruction to switch the first RX queue to an event generation-enabled mode and includes a next activity location in the first RX queue, and wherein the circuitry and logic is further to:
switch an operational mode of the first RX queue from the event generation-masked mode to the event generation-enabled mode;
enqueue a descriptor at the next activity location in the first RX queue; and
enqueue the first event in the first REQ, wherein the first event includes information identifying the first RX queue and the next activity location.

18. The apparatus of claim 17, wherein the circuitry includes a storage device in which instructions are stored and at least one processing element on which the instructions are executed.

19. The apparatus of claim 11, wherein the apparatus comprises one of a network adaptor, a network interface controller, an InfiniBand host controller adapter, or a host fabric interface.

20. The apparatus of claim 11, wherein the I/O interface comprises a Peripheral Component Interconnect Express (PCIe) interface, and the apparatus is configured to enqueue descriptors and write packet data into the host memory using PCIe direct memory access (DMA) transactions.

21. A computer platform, comprising:
a processor including a plurality of cores;
host memory, communicatively coupled to the processor, one or more storage devices in which software instructions are stored; and
a hardware device, communicatively coupled to the processor via an input/output link, the hardware device including circuitry and one or more ports configured to enable the hardware device to receive packets from one or more networks,
wherein the computer platform is configured, via execution of the software instructions on the processor and via the circuitry in the hardware device, to,
implement a plurality of receive (RX) queues in the host memory in which descriptors generated by the hardware device are enqueued;
logically partition the RX queues into one or more pools, each RX queue pool associated with a respective interrupt vector;
implement one or more receive event queues (REQ) in the host memory, each REQ associated with a respective RX queue pool and associated interrupt vector;
selectively enable generation of events for one or more of the plurality of RX queues;
in response to a first event associated with a first RX queue for which event generation is enabled,
enqueue a first event in a first REQ associated with a first interrupt vector and the first RX queue, the first event including information used to service the first event;
assert a first interrupt using the first interrupt vector; and
access the first event from the first REQ in response to the first interrupt to service the first event.

22. The computer platform of claim 21, wherein the circuitry in the hardware device is further configured to:
perform flow classification of packets in a stream of packets belonging to one or more packet flows that are received at a first port;
generate descriptors associated with the received packets; and
enqueue the descriptors in one or more of the plurality of RX queues based on the packet flows to which the packets associated with the descriptors are classified, the enqueuing of descriptors including enqueuing a descriptor in the first RX queue for a packet classified to a first packet flow,
wherein enqueuing a descriptor in the first RX queue while generation of events is enabled for the first RX queue is a cause of the first event.

23. The computer platform of claim 22, wherein the circuitry in the hardware device is further configured to:
mask generation of events on the first RX queue;
while generation of events on the first RX queue is masked,
enqueue descriptors for packets received at the first port for the first flow in the first RX queue without enqueuing any additional events in the first REQ nor asserting any interrupts associated with enqueuing descriptors in the first RX queue.

24. The computer platform of claim 21, wherein the computer platform is further configured, via execution of the software instructions on the processor and via the circuitry in the hardware device, to:
prior to selectively enabling generation of events on the first RX queue, employ a software polling mode and an interrupt-masked mode on the hardware device to process descriptors enqueued in the first RX queue; and
process descriptors that have been enqueued by the hardware device in the first RX queue in a First-In First-Out (FIFO) order;
determine a next activity location in the first RX queue corresponding to a FIFO slot at which a next descriptor will be processed; and
send or write information to the hardware device instructing the hardware device to switch to an event generation-enabled mode for the first RX queue, the information including the next activity location.

25. The computer platform of claim 24, wherein the computer platform is further configured, via execution of the software instructions on the processor and via the circuitry in the hardware device, to:
enqueue a descriptor at the next activity location in the first RX queue;
enqueuing the first event in the first REQ, wherein the first event includes information identifying the first RX queue and the next activity location; and
service the first event by accessing the first event from the first REQ identifying the first RX queue using information in the first event, and process the descriptor at the next activity location in the first RX queue identified by the REQ event.

* * * * *